US011940296B2

(12) United States Patent
Martinsen et al.

(10) Patent No.: US 11,940,296 B2
(45) Date of Patent: Mar. 26, 2024

(54) APPARATUS AND A METHOD FOR SECURING AT LEAST ONE MEASURING DEVICE TO AN OBJECT

(71) Applicant: KAEFER BLU AS, Stavanger (NO)

(72) Inventors: Arve Martinsen, Klepp St. (NO); Thomas Aunvik, Kleppe (NO)

(73) Assignee: Kaefer Blu AS, Stavanger (NO)

( * ) Notice: Subject to any disclaimer, the term of this patent is extended or adjusted under 35 U.S.C. 154(b) by 129 days.

(21) Appl. No.: 17/772,383

(22) PCT Filed: Nov. 10, 2020

(86) PCT No.: PCT/NO2020/050276
§ 371 (c)(1),
(2) Date: Apr. 27, 2022

(87) PCT Pub. No.: WO2021/096367
PCT Pub. Date: May 20, 2021

(65) Prior Publication Data
US 2022/0412781 A1 Dec. 29, 2022

(30) Foreign Application Priority Data

Nov. 11, 2019 (NO) .................................... 20191336

(51) Int. Cl.
*G01D 11/30* (2006.01)
(52) U.S. Cl.
CPC .................................... *G01D 11/30* (2013.01)
(58) Field of Classification Search
CPC .................................................. G01D 11/30
See application file for complete search history.

(56) References Cited

U.S. PATENT DOCUMENTS

| 5,199,297 A | 4/1993 | Lin et al. |
| 2004/0182132 A1 | 9/2004 | Head |

(Continued)

FOREIGN PATENT DOCUMENTS

| CN | 109100415 | 12/2018 |
| EP | 1923689 | 5/2008 |

(Continued)

OTHER PUBLICATIONS

Norwegian Search Report for NO20191336, dated Mar. 9, 2020.
International Search Report and the Written Opinion for PCT/NO2020/050276, dated Jan. 28, 2021.

*Primary Examiner* — Jamel E Williams
(74) *Attorney, Agent, or Firm* — Andrus Intellectual Property Law, LLP

(57) ABSTRACT

An apparatus and a method are for securing at least one measuring device to an object. The measuring device is configured for monitoring the object and is provided with a penetrating element for perforating a sheet forming part of the object. The apparatus has a body having a housing for holding the measuring device and an assembling device for moving the measuring device with respect to the housing. The assembling device has an engagement means movable between a retracted, passive position, and an extended, active position for engaging the measuring device to urge the penetrating element of the measuring device through the sheet of the object to secure the measuring device to the object. A control device is for operating the assembling device.

20 Claims, 25 Drawing Sheets

(56) References Cited

U.S. PATENT DOCUMENTS

| | | |
|---|---|---|
| 2010/0275694 A1 | 11/2010 | Roberts |
| 2017/0131214 A1 | 5/2017 | Gutiérrez Pérez et al. |
| 2019/0086020 A1* | 3/2019 | Wehlin ................. G01N 29/225 |

FOREIGN PATENT DOCUMENTS

| | | |
|---|---|---|
| EP | 2937622 | 10/2015 |
| GB | 2538747 | 11/2016 |
| JP | 2018105494 | 7/2018 |
| WO | 2017123166 | 7/2017 |

\* cited by examiner

APPARATUS AND A METHOD FOR SECURING AT LEAST ONE MEASURING DEVICE TO AN OBJECT

CROSS-REFERENCE TO RELATED APPLICATIONS

This application is the U.S. national stage application of International Application PCT/NO2020/050276, filed Nov. 10, 2020, which international application was published on May 20, 2021, as International Publication WO 2021/096367 in the English language. The International Application claims priority of Norwegian Patent Application No. 20191336, filed Nov. 11, 2019. The international application and Norwegian application are both incorporated herein by reference, in entirety.

FIELD

The present disclosure is related to a mounting apparatus. More particularly, the disclosure is related to an apparatus and a method for securing at least one measuring device to an object. The object may typically be elongate such as an insulated pipe.

BACKGROUND

In for example a process plant, it may for technical, economic, or environmental reasons be necessary to insulate pipelines and related equipment such as valves and pumps, from the surrounding environment. A thermal insulation is most common, but a need for insulation may also be due to sound.

There are two main purposes for thermal insulation of a pipeline and related equipment.

One purpose of thermal insulation of a pipeline is to reduce a heat exchange between a fluid flowing through the pipeline and the surrounding environment.

Another purpose of thermal insulation is to protect the pipeline and/or fluid flowing through the pipeline, against heat that may occur for example in the event of a fire.

Depending on a temperature difference between an outside of the insulation facing a surrounding environment, and an inside of the insulation facing an object such as a pipe, and a relative humidity of the air within the insulation, condensation may occur. Such condensation may represent challenges with respect to reduced effect of the thermal insulation and increased weight. However, the most serious consequence of such condensation is increased risk of corrosion of the insulated equipment. Such corrosion is known as CUI (Corrosion Under Insulation) and represents a safety risk in addition to increased maintenance costs.

CUI may also be caused by ingress of water through a damaged sheeting surrounding the insulation.

To monitor a risk for CUI, and thus to provide information for preparing a controlled maintenance program, it is known to provide measuring devices along the insulated equipment such as a pipe and appurtenant equipment. A measuring device for the purpose of monitoring the risk of CUI, typically, but not exclusively, comprises a moisture sensor. A measuring device of this type is configured for sensing within a portion of insulation material, typically at or near a lowermost portion thereof and on an inside of a protective sheet surrounding the insulation. A protective sheet is normally made from a corrosion resistant metal. Thus, a sensing device of a sensor apparatus for measuring CUI must penetrate the protective sheet in order to serve its purpose. However, other types of sensors such as for example vibration sensors or noise sensors may be arranged on an outside of a metal sheet.

Hitherto, such sensor apparatus have been connected to pipelines and appurtenant equipment such as for example insulated valves, by manual operations wherein each single sensor apparatus is connected by an operator using suitable equipment such as a drill for drilling a fastening means through the metal sheet and inserting the sensing device through the sheet.

A pipeline in a process plant is often arranged elevated with respect to a ground and at an elevation being beyond reach for an operator being on the ground. To reach such an elevated pipeline, it is necessary to install scaffolding to provide a safe base for the operator. In some situations, for example on an offshore drilling rig, it may even be impossible to install scaffolding. In such a situation the operator must use so-called rope access technology which normally requires certified climbers. Use of scaffolding or rope access technology is time consuming and represents a negative safety aspect for the personnel being involved in the operation.

In situations where the pipeline is within reach of an operator, there is still a need for a more effective way of installing the sensors.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

The inventor has developed an apparatus and a method where a plurality of sensors may be installed autonomous where, in one embodiment of the invention, personnel involved may be physically distant, i.e. without reach, to for example an object such as a pipeline.

However, in another embodiment of the invention, the operator must be adjacent, i.e. within reach, of the object.

In a first aspect of the invention there is provided an apparatus for securing at least one measuring device to an object, the measuring device being configured for monitoring the object and is provided with a penetrating element for penetrating a sheet forming part of the object, the apparatus comprising:
  a body comprising:
    a housing for holding the measuring device; and
    an assembling device for moving the measuring device with respect to the housing, the assembling device comprising an engagement means movable between a retracted, passive position, and an extended, active position for engaging the measuring device to urge the penetrating element of the measuring device through the sheet of the object to secure the measuring device to the object; and
  a control device for operating the assembling device.

The housing may comprise a magazine for holding at least two measuring devices prior to mounting on the object. A magazine holding at least two measuring devices will inter alia make the process of securing the measuring devices to the object more effective since time spent for reloading the apparatus with measuring devices will be reduced.

The apparatus may be handheld by an operator. Prior to activating the assembling device, the operator will bring the housing of the handheld apparatus to abut against the sheet of the object. However, it may be advantageous if the apparatus is provided with a fastening device that is configured for releasably securing the body to the object at a desired position prior to activating the assembling device of the apparatus. A body secured to the object by means of a fastening device allows the operator to have both hands free when the assembling device is activated, while at the same time the apparatus is substantially prevented from moving with respect to the object. Further, with both hands free, the operator, or another operator may operate the assembling device of the apparatus from a distant location, presupposed that the control device communicates with the assembling device.

The fastening device may in one embodiment be for example a strap securable to the body of the apparatus and being configured to surround a portion of the object. A strap of this kind will require a manual operation from an operator.

As an alternative to a manually operated strap, the fastening device may be a gripping device configured for being moved both ways between a passive, non-gripping position, and an active, gripping position wherein the gripping device grips around a portion of the object. In a preferred embodiment, such a gripping device may be provided with a driving apparatus, such as a servo, to move the gripping device between the passive and active positions, and vice versa, and any intermediate positions. By bringing the gripping device from its active position wherein the body of the apparatus abuts against the object, to an intermediate position in which the body of the apparatus does not abut against the object, but still holds the body at a distance from the object, allows the gripping device to be displaced along the object without disengaging therefrom. If the apparatus is provided with a magazine as mentioned above, at least two measuring devices may be secured at spaced apart positions without fully releasing the apparatus from the object. A more effective securing of the measuring devices is thus achieved. Preferably, the control device configured for operating the assembling device, is further configured for operating the gripping device.

The displacement of the apparatus with respect to the object may be provided by means of a force applied by an operator. Such a manual displacement presupposes that the operator is within reach of the apparatus. However, to facilitate movement of the apparatus along the object, it is an advantage if the apparatus is provided with a manipulator mechanism for moving the body with respect to the object. The manipulator mechanism may for example be of the kind disclosed in publication WO 2017/123166, wherein a movable detector is displaced along a tube-like object by means of sets of wheels clamping the movable detector onto the tube-like object, and wherein some of the wheels are provided with a motor for rotating the wheels. Such a manipulator might be appropriate for use on an elongated object without obstructions protruding from a surface of the object. However, an object such as for example a pipeline in a process plant will normally comprise obstructions such as for example supports, pipe branches etc.

Preferably, to pass such obstructions, the manipulator mechanism may comprise a manipulator arm. Alternatively, the manipulator mechanism may be a drone configured for being operated from a distant location. The gripping device configured for being moved both ways between a passive, non-gripping position, and an active, gripping position wherein the gripping device grips around a portion of the object, may in one embodiment comprise a primary gripping device and a secondary gripping device for releasably gripping the object, the secondary gripping device operatively connected to the primary gripping device by means of the manipulator arm. The manipulator arm is of a type known per se.

In an embodiment wherein the gripping device comprises a primary gripping device and a secondary gripping device for releasably gripping the object, and the secondary gripping device is operatively connected to the primary gripping device by means of the manipulator arm, and the housing comprises a magazine for holding at least two measuring devices prior to mounting on the object. The magazine and the assembling device may be arranged in connection with the primary gripping device. In such an embodiment, the secondary gripping device may be similar to the primary gripping device.

In one embodiment the secondary gripping device is provided with a similar magazine and assembling device as the primary gripping device. Thus, in such an embodiment, the apparatus comprises a further magazine and a further assembling device arranged in connection with the secondary gripping device so that the apparatus comprises two magazines and corresponding assembling devices. Providing the secondary gripping device with a similar magazine and assembling device as the primary gripping device has the effect that a measuring device can be installed by means of any one of the primary gripping device and the secondary gripping device as long as at least one of the gripping devices is in engagement with the object.

The manipulator arm may be configured for moving the primary gripping device with respect to the secondary gripping device at least in a two-dimensional plane. This has the effect that the apparatus may move along the object in a worm-like movement by releasing one of the gripping devices while the other one is in engagement with the object. In an alternative to said worm-like movement, the apparatus may move in a straddle-like movement wherein one of the primary gripping device and the secondary gripping device may be released from engagement with the object and straddle past the other one of the secondary gripping device and the primary gripping device which is in engagement with the object.

Preferably, the manipulator arm may be configured for a three-dimensional movement, i.e. a movement in an X-Y-Z plane. This has the effect that the apparatus may move along an object having an axis extending in an X-Y-Z plane which is oftentimes the situation for example for an object in the form of a pipeline in a process plant, wherein the pipeline comprises bends and obstructions.

Preferably, the engagement means of the assembling device is operatively connected to a motor for effecting axial movement of the engagement means, thereby effecting the aforementioned axial movement of the penetrating element of the measuring device and thereby effecting said perforation of the metal sheet of the object to connect the measuring device to the object.

The measuring device may be provided with a penetrating element being in the form of a puncturing element or in the form of a bit. The sheet of the object may be relatively thin, typically in the range of 0.5-0.9 mm depending on a diameter of the sheet. Using a puncturing element may result in an indentation in the sheet in an area surrounding the aperture to be made by the penetrating element. Therefore, a penetrating element in the form of a bit may be preferred. To activate such a bit, the assembling device of the apparatus may be further provided with a rotation motor configured for effecting rotating of the engagement means and thereby the penetrating element.

The apparatus according to the invention may typically, but not exclusively, be used for securing measuring devices to a sheet providing an outer covering of an insulated pipeline in a process plant. Such a sheet is typically made of metal. When the measuring device being secured to the object by means of the apparatus disclosed herein comprises a rotating bit, a temperature will increase due to friction during the drill-in operation.

In an explosion hazardous area, known as an Ex Zone or Ex Area, there are strict requirements with regards inter alia to a maximum temperature provided by such a drill-in operation. The maximum temperature allowed depends on an assessment of the frequency of the occurrence and duration of an explosive gas atmosphere, and may be as low as maximum 70° C. To comply with the requirement of such an Ex Zone, the assembling device may be configured for rotating slowly Depending on the thickness of the sheet being penetrated, the rotating speed of the assembling device should be less than 50 revolutions/sec, preferably less than 20 revolutions/sec, most preferably less than 10 revolutions/sec. In a prototype of the apparatus, a rotary speed of the assembling device is as low as 3 revolutions/sec.

In one embodiment the apparatus is further provided with cooling device directing a fluid flow towards the penetration area of the bit of the measuring device and/or towards a portion of the bit. The fluid is preferably a gas.

A gas may for example be ambient air sucked into a compartment prior to being expelled through a nozzle directed towards a desired area, or it may be utility air supplied to the nozzle from a distant location. Alternatively, the gas may be an inert gas supplied from a pressurized gas container forming part of the apparatus, or from a distant location. An advantage of using a gas is that a gas will not negatively influence the object to which the measuring device is connected.

A cooling fluid in the form of a liquid may for example be an oil of other suitable cooling liquid.

Independently of providing a cooling device or not, an oil may be applied to the bit of the measuring device prior to starting the penetration operation. An oil will reduce friction and thus temperature increase during the cutting operation.

In some embodiments of the apparatus disclosed herein there are great advantages in that measuring devices can be installed without scaffolding or other remedies, and in that the apparatus can be controlled from a remote location. This has great advantages both from an HSE (Health, Safety and Environment) point of view, and from an economical point of view.

The control unit may be integrated in the apparatus, or it may be a remote-control unit.

In an embodiment wherein the control unit is a remote-control unit, the apparatus may be provided with a cable for transmitting control signals from the remote-control unit to the components of the apparatus. The cable may further comprise a cable for supplying power for operating the components of the apparatus. Alternatively, the power supply may be integrated within one or more of the components of the apparatus by means of one or more battery packages.

In an alternative to transmitting the control signals to the components via cable, the signals may be transmitted wirelessly, for example by means of radio signals or Wi-Fi.

In one embodiment, the assembling device, and any magazine, may be arranged in connection with the gripping device. This has the effect that the apparatus may be compact.

The apparatus according to the first aspect of the invention may be configured for using measuring devices already available on the market. The measuring devices may for example be a moisture sensor, a temperature sensor, a noise sensor, a vibration sensor, and a measuring device for providing position data based on the GPS-system, or a combination of two or more thereof. Preferably, the sensor or sensors are provided with a transmitter for transmitting data to a receiving unit known per se. The data sent by the transmitter may comprise position data in addition to sensed data such as moisture, temperature, noise, and/or vibration.

Depending on the type of measuring device, the bit of the measuring device may be provided with a sensing means so that the sensing means is located within a portion of an insulation material or at an outer periphery of the insulation material.

The apparatus may further comprise a monitoring device operatively connected to one or more of the components of the apparatus, wherein the monitoring device is configured for providing an image of a portion of a surface of the object. Such a monitoring device may typically be selected from the group consisting of a camera and a scanner. An apparatus having a monitoring device configured for providing an image of a portion of a surface of the object, has the effect that the apparatus may be used for presenting information concerning the status of the surface of the object. In one embodiment, the monitoring device may record the gained information. In another embodiment, the gained information may be transmitted in real time to a remote visual display unit. In still another embodiment the gained information may be both recorded and transmitted to a remote visual display.

A monitoring device in the form of a camera may be used for providing an operator with real time information for example related to where to connect the measuring devices. This is particularly useful if the operator is prevented from seeing the relevant part of the object.

The monitoring device may be used independently of the assembling device configured for bringing one of the measuring devices subsequently from the apparatus and onto the object so that the measuring device is connected to the object at the desired position.

As an alternative to providing the apparatus with a primary gripping device connected to a secondary gripping device by means of a manipulator arm, the manipulator mechanism may be a drone configured for moving the components of the apparatus to desired positions along the object onto which the measuring devices are to be connected. One advantage of providing a manipulator mechanism in the form of a drone, is that the measuring devices may be quickly installed even when widely spaced apart at relatively great distances. For the alternative manipulator mechanism comprising the manipulator arm discussed above, a movement along an object is limited by the length of the manipulator arm. Thus, a movement for installing the measuring devices with a distance being greater than the length of the manipulator arm will require at least one "intermediate" gripping and releasing movement of at least one of the primary gripping device and the secondary gripping device. Another advantage of providing a manipulator mechanism in the form of a drone, is that the apparatus may be easily relocated between for example a ground and an elevated object by means of the drone.

Also described herein is an apparatus being an alternative to the apparatus of the first aspect of the invention, wherein the apparatus is configured for monitoring a surface of an object, wherein the apparatus is remotely controlled and comprises:
- a control unit for controlling components of apparatus, the components comprising:
- a gripping device for releasably engaging the object;
- a manipulator mechanism for moving the gripping device into contact with the object at a desired position on the object; and
- a monitoring device operatively connected to one or more of the components of the apparatus, wherein the monitoring device is configured for providing an image of a portion of a surface of the object.

The gripping device and the manipulation mechanism and the way of controlling those components, are similar to those of the alternative first aspect of the invention. The control unit may be integrated in the apparatus, or a remote-control unit.

The alternative apparatus is provided with a remote-control unit makes possible operating the monitoring device from a remote location. In image of a portion of the object can be provided without the need for installing scaffolding or other remedies. This has great advantages both from an HSM point of view, and from an economical point of view.

Thus, the alternative apparatus, like the apparatus according to the first aspect of the invention, is by means of the control unit, the gripping device, and the manipulator mechanism configured for moving along an object being out of physical reach from for example an operator.

The alternative apparatus may further be provided with a magazine for holding the at least two measuring devices prior to mounting the measuring devices on the object, and an assembling device for mounting the measuring devices onto the object.

In a second aspect of the invention there is provided a method for securing at least one measuring devices to an object, wherein the method comprises the steps of:
a) providing an apparatus according to the first aspect of the invention;
b) abutting the apparatus against a desired portion of the object;
c) activating the assembling device to bring the engagement means into engagement with the measuring device and urge the penetrating element of the measuring device through the metal sheet of the object so that the measuring device is secured to the object; and
d) releasing the assembling device from the measuring device.

The method may further comprise the steps of:
e) moving the apparatus to a new location and aligning a further measuring device with respect to the assembling device; and
f) repeating steps b)-e) until a predetermined number of measuring devices have been secured to the object.

The method may further comprise moving the apparatus to a new location by means of a manipulator mechanism in the form of a manipulator arm, and securing the apparatus to the object by means of a gripping device comprising a primary gripping device and a secondary gripping device for releasably gripping the object, wherein the secondary gripping device is operatively connected to the primary gripping device by means of the manipulator arm.

As an alternative to moving the apparatus to a new location by means of a manipulator mechanism in the form of a manipulator arm, the apparatus may be moved to a new location by an operator, and secured to the object by means of a releasable securing device, such as a strap.

Also disclosed herein is a method for monitoring a surface of an object, wherein the method comprises the steps of:
a) providing an apparatus according to the first aspect of the invention, wherein the apparatus is further provided with a monitoring device;
b) activating the manipulator mechanism for moving the gripping device into contact with the object at a desired position on the object and engaging the gripping device with the object;
c) activating the monitoring device at the desired position;
d) releasing the gripping device from engagement with the object; and
e) repeating steps b) to e) until a desired monitoring of the object is achieved.

The manipulator mechanism may be a manipulator arm, and the gripping device may comprise a primary gripping device and a secondary gripping device for releasably engaging the object, the secondary gripping device operatively connected to the primary gripping device by means of the manipulator arm, the method may further comprise:

moving by means of the manipulator arm one of the primary gripping device and the secondary gripping device to a desired position at least in a two-dimensional plane while the other one of the primary gripping device and the secondary gripping device engages the object. In such an embodiment, the monitoring device may be moved along an object, for example a pipeline, by arranging the monitoring device at one of the primary gripping device and the secondary gripping device, and connecting the apparatus to the object by means of the other one of the secondary gripping device and the primary gripping device. In such an embodiment the gripping device carrying the monitoring device may function as a guide enclosing but not gripping a portion of the object.

In an alternative embodiment to providing the manipulator mechanism by means of a second gripping device and the manipulator arm, the manipulator mechanism may be provided by means of a drone. In this alternative embodiment, the method may further comprise moving by means of the drone, the gripping device to a desired position while the drone carries the components of the apparatus.

BRIEF DESCRIPTION OF THE DRAWINGS

In the following is described examples of preferred embodiments illustrated in the accompanying drawings, wherein:

FIG. 2b shows in a larger scale a detail of a portion of the apparatus shown in FIG. 2a;

DETAILED DESCRIPTION OF THE DRAWINGS

Figure 1A:
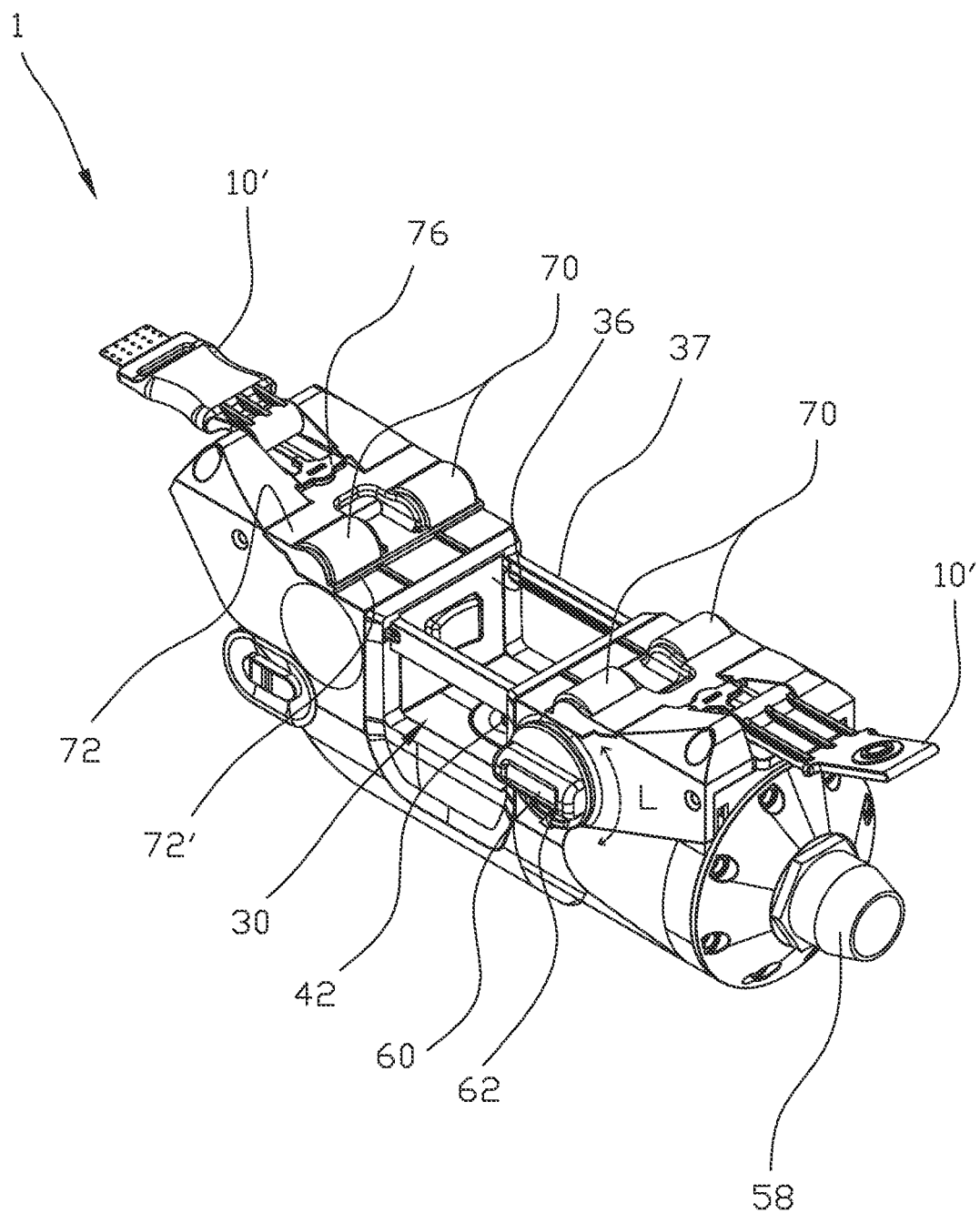
FIG. 1a shows a perspective view of a first embodiment of the apparatus according to a first aspect of the invention.
Figure 1B:
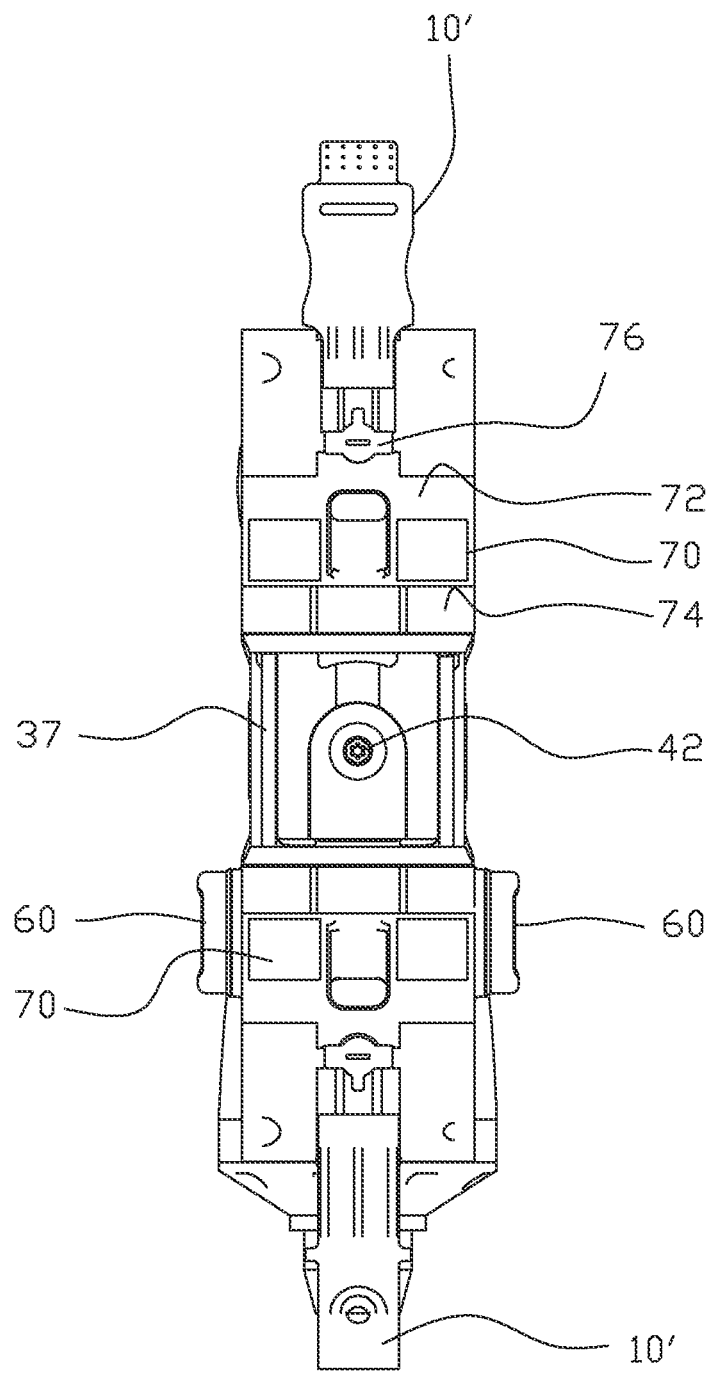
FIG. 1b shows the apparatus in FIG. 1a seen from above.

Positional indications such as for example left and right, above, refer to the position shown in the figures.

In the figures, same or corresponding elements are indicated by same reference numerals. For clarity reasons some elements are in some of the figures without reference numerals. Only those elements considered relevant for understanding the invention are indicated by reference numerals and described below.

A person skilled in the art will understand that the figures are just principle drawings. The relative proportions of individual elements may also be distorted.

In the figures reference numeral 1 denotes an apparatus according to the present invention.

Figure 1C:
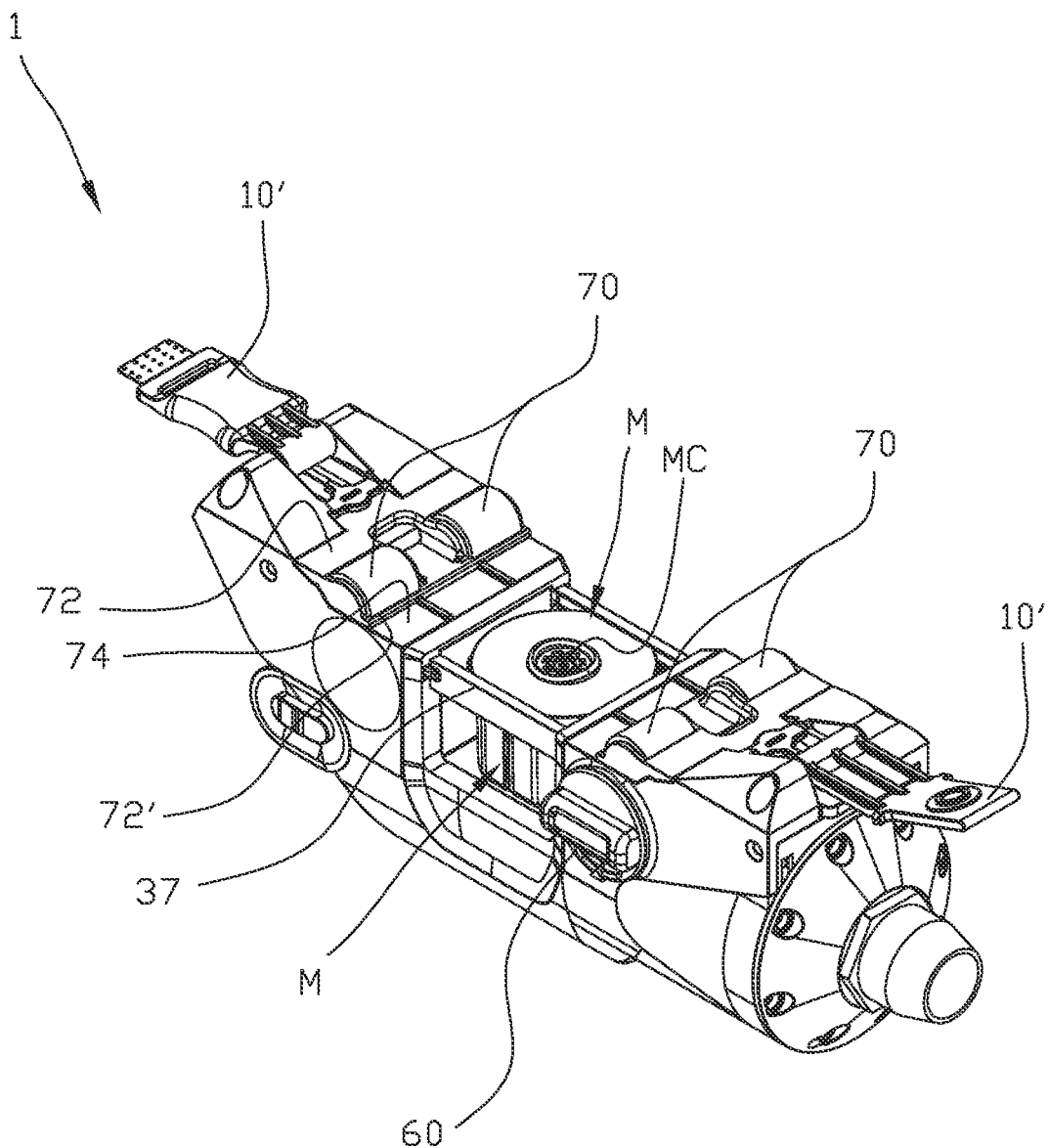
FIG. 1c shows the apparatus in FIG. 1a, wherein the apparatus houses a measuring device.
Figure 1D:
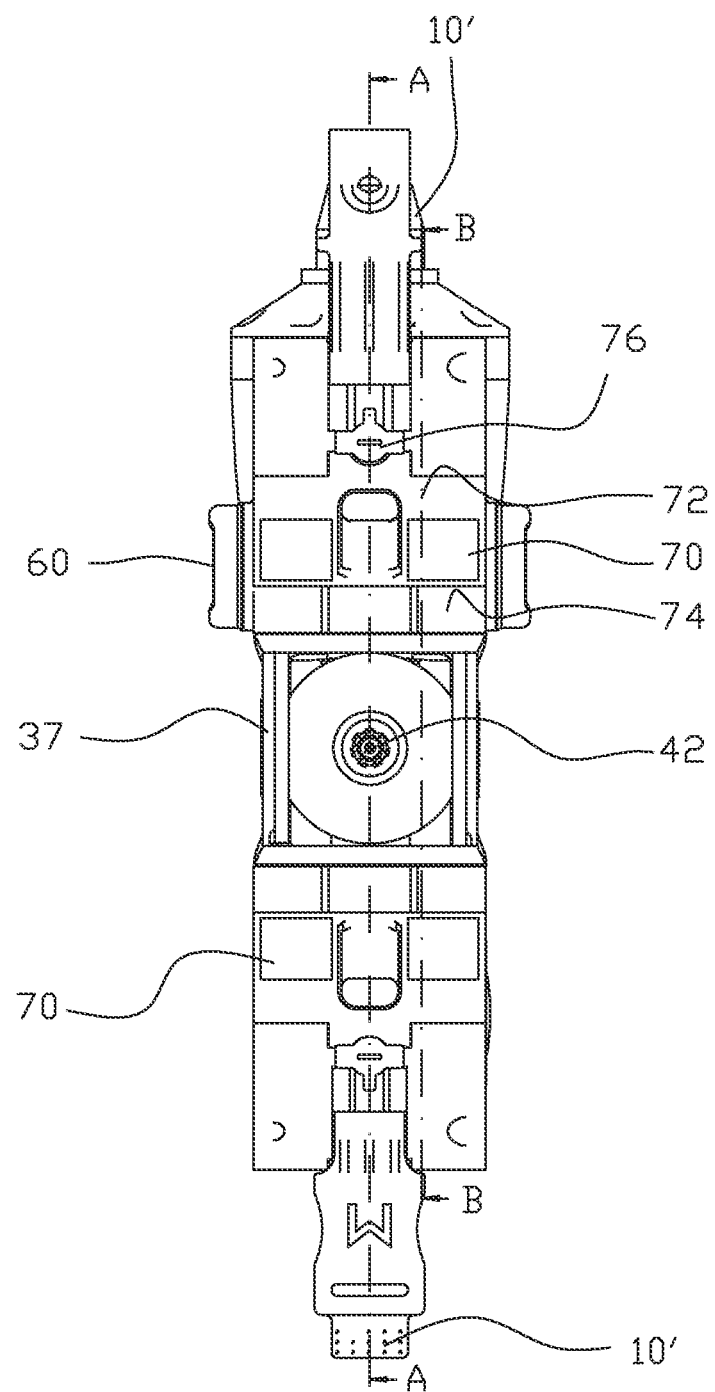
FIG. 1d shows the apparatus in FIG. 1d seen from above.
Figure 1E:
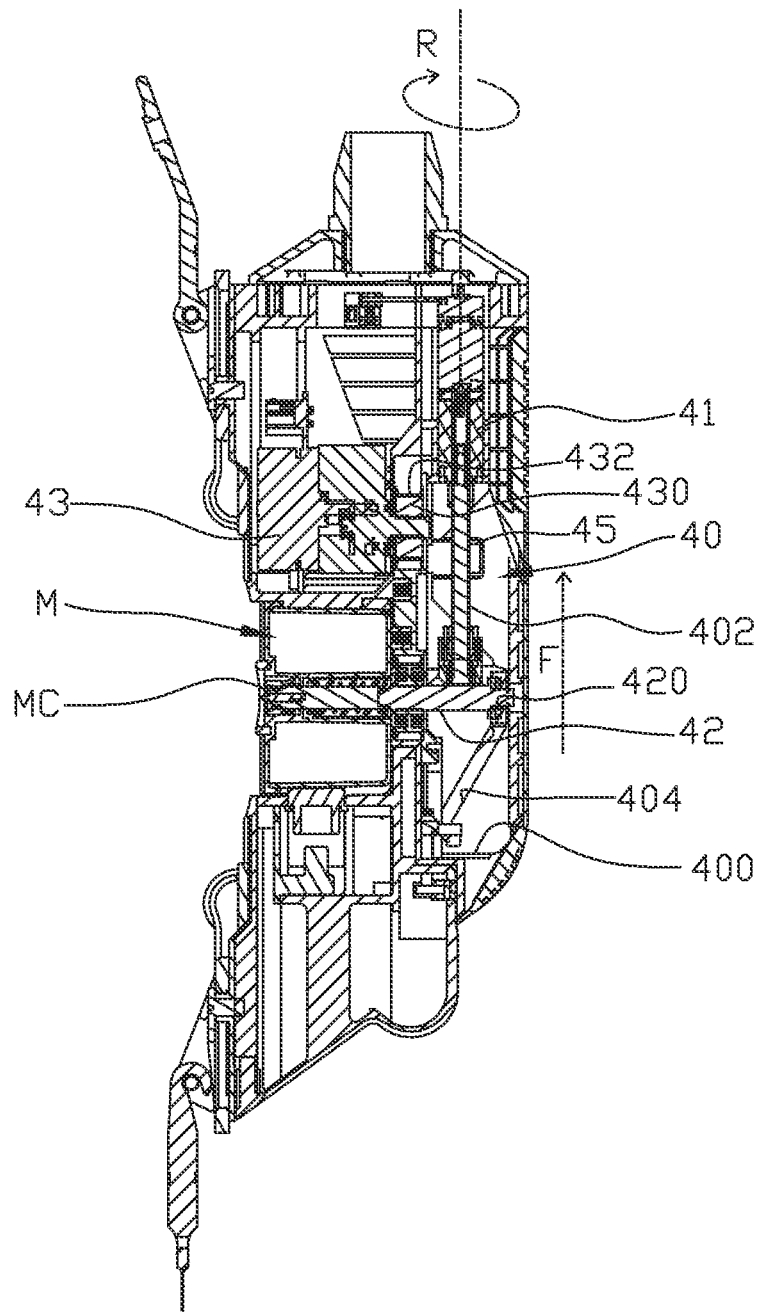
FIG. 1e shows a cut through A-A in FIG. 1d.
Figure 1F:
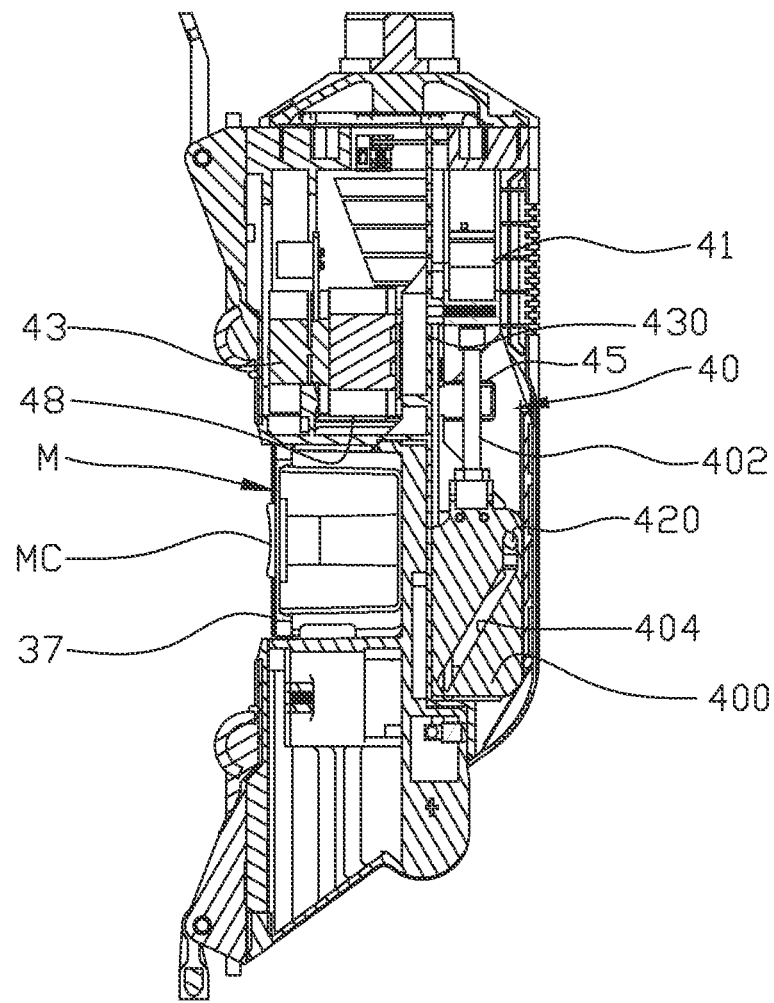
FIG. 1f shows a cut through B-B in FIG. 1d.
Figure 1G:
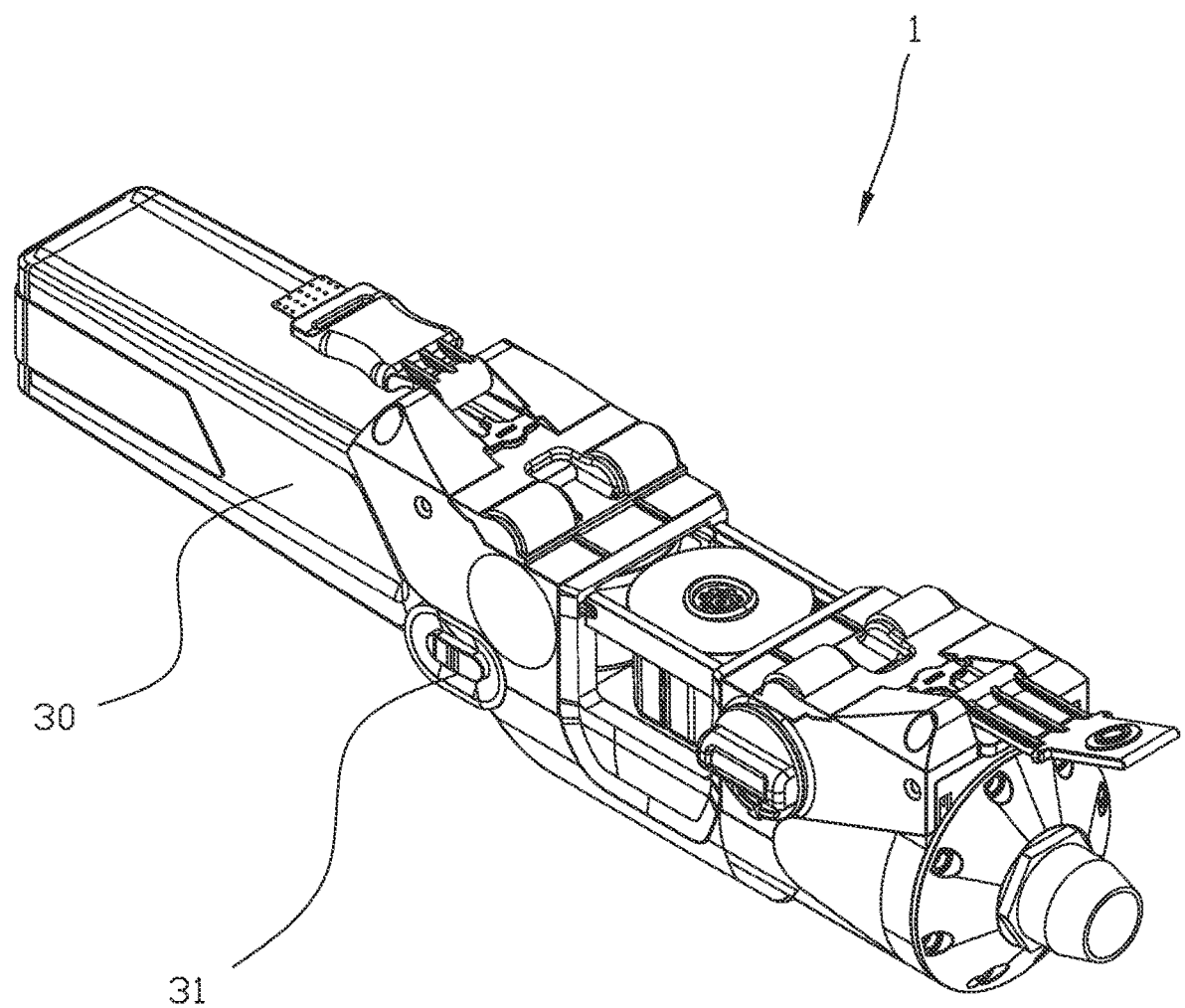
FIG. 1g shows the apparatus in FIG. 1c provided with a magazine.
Figure 1H:
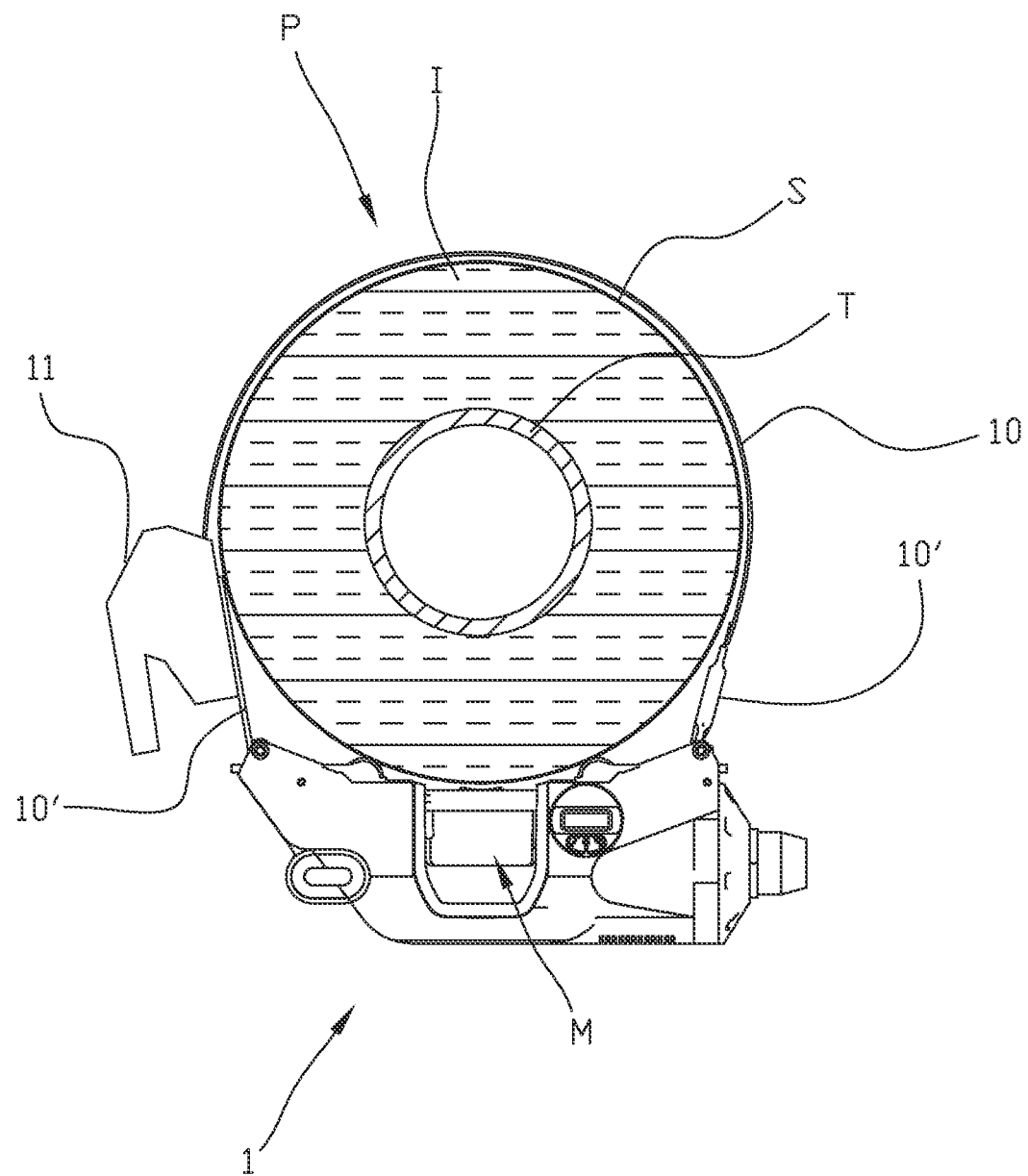
FIG. 1h shows the apparatus connected to an insulated pipeline by means of a strap.

FIGS. 1a-1h show a first embodiment of the apparatus 1 according to the first aspect of the invention. The apparatus 1 is configured for securing a measuring device M to an object P which in the embodiment shown in FIG. 1h is in the form of an insulated tubing T, wherein an insulation I surrounding the tubing T is protected from the environment by means of a sheet S. The sheet S is typically made of metal.

The measuring device M is provided with one or more sensors for monitoring the object P and is provided with a penetrating element MC for perforating the sheet S forming part of the object P.

The apparatus 1 shown in FIGS. 1a-1h is configured for being brought into position of use, i.e. against an outer surface of the sheet S, by a hand of an operator. Thus, the apparatus 1 shown in FIGS. 1a-1h is in this document also denoted handheld apparatus 1.

The apparatus 1 comprises a body having a housing 30 for holding the measuring device M as shown in FIG. 1c prior to securing the measuring device M to the sheet S of the object P. The body further comprises an assembling device 40 for moving the measuring device M with respect to the housing 30.

Figure 2A:
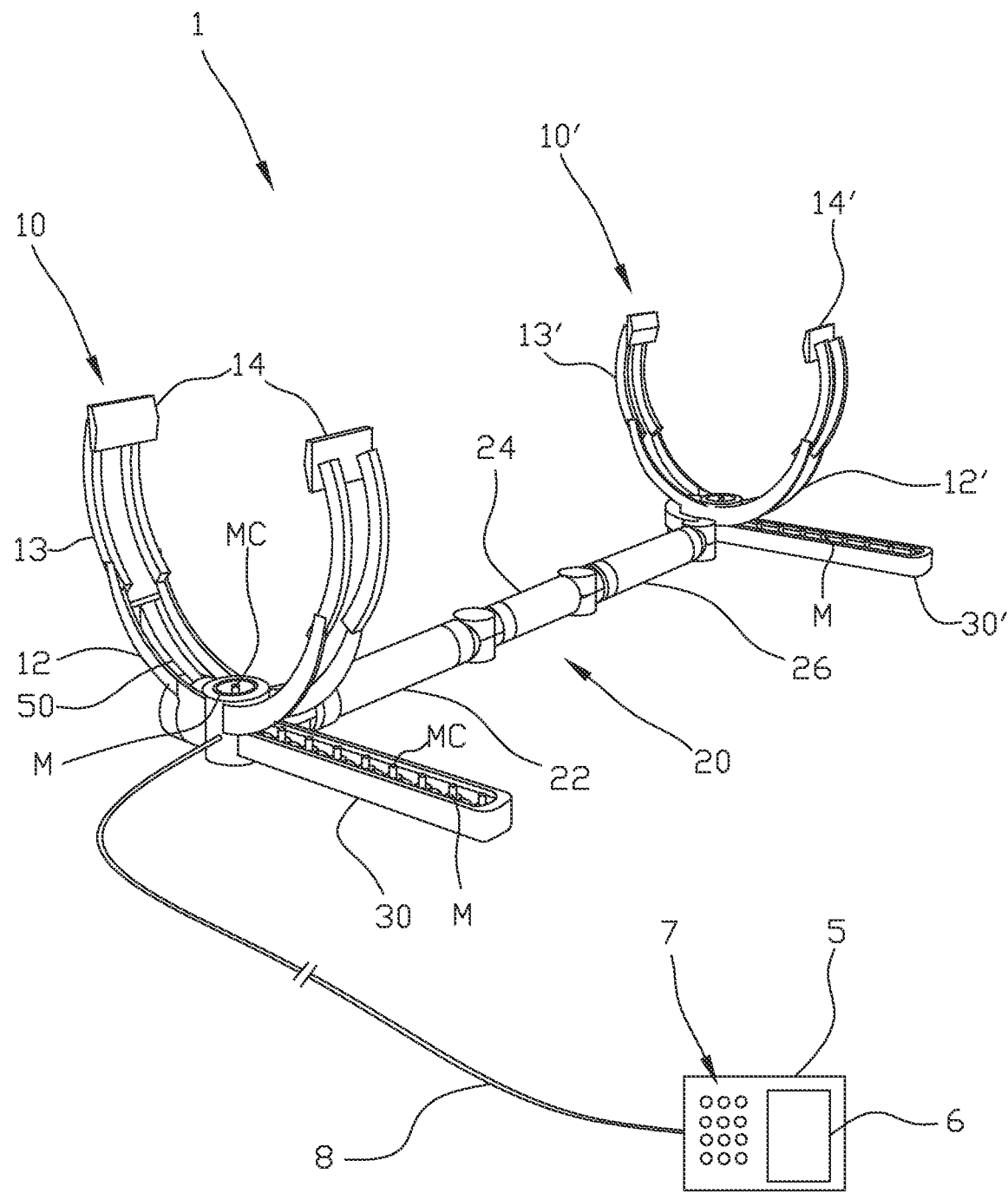
FIG. 2a shows a perspective view of second embodiment of the apparatus according to a first aspect of the present invention.

The assembling device 40 shown in FIGS. 1e and 1f comprises an engagement means, here in the form of a bit 42, movable between a retracted, passive position as shown, and an extended, active position for engaging a lower end portion of a penetrating element MC of the measuring device M to urge the penetrating element MC through the sheet S of the object P (see FIG. 1h) to secure the measuring device M to the sheet S. The assembling device 40 is operated both ways between said passive and active positions by means of a control device 5. The control device may be a remote-control unit comprising a control panel 5, for example of a kind as shown in FIG. 2a. The control panel 5 is connected to the apparatus 1 via a cable 8 having a plug (not shown) mating a socket 58 of the apparatus 1. In an alternative embodiment (not shown) the control device is attached to or forms part of the body of the apparatus 1.

FIGS. 1e and 1f show a cut through A-A and B-B of FIG. 1d, respectively, wherein the assembling device 40 comprises a bit motor 41 for bringing the bit 42, into and out of engagement with a portion of the measuring device M. In the embodiment shown, the bit motor is a slide motor 41 operatively connected to a slide 400 via a treaded shaft 402 in a manner known per se. The slide 400 comprises an inclined slot 404 being a guide for a pin 420 extending from a lower end portion of the bit 42.

When the slide motor 41 is rotated as indicated by arrow R, the slide 400 is urged from left towards right as indicated by arrow F in FIG. 1e, and the pin 420 and thus the bit is moved upward from a retracted, passive position as shown in the FIGS. 1e and 1f, to an extended, active position. By reversing the rotation of the slide motor 41, the slide 400 is urged from a right position (not shown) to the left position as shown, and the bit 42 is moved from the extended, active position to the passive, retracted position.

The measuring device M may be provided with a penetrating element being in the form of a puncturing element (not shown) or in the form of a drill bit or cutting head MC as shown best in FIG. 1c. As discussed above, a penetrating element in the form of a cutting head MC is preferred. However, if the penetrating element is in the form of a puncturing element, for example in the form of an arrowhead (not shown) or another type of puncturing element, there may be no need for a rotation of the penetrating element.

Figure 5A:
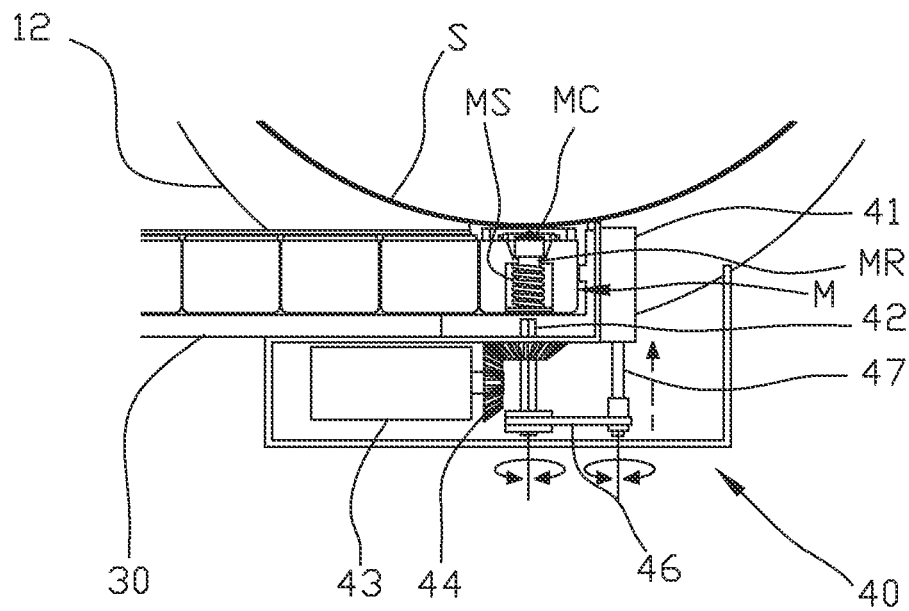
FIGS. 5a-5e show in a larger scale principle views of various steps of operating the assembling device according to the first aspect of the invention.
Figure 5B:
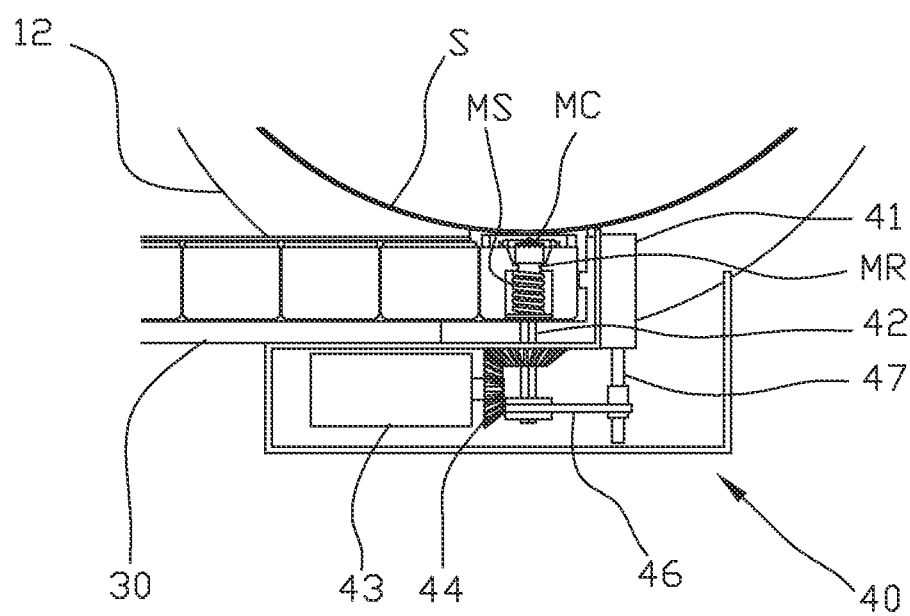
Figure 5C:
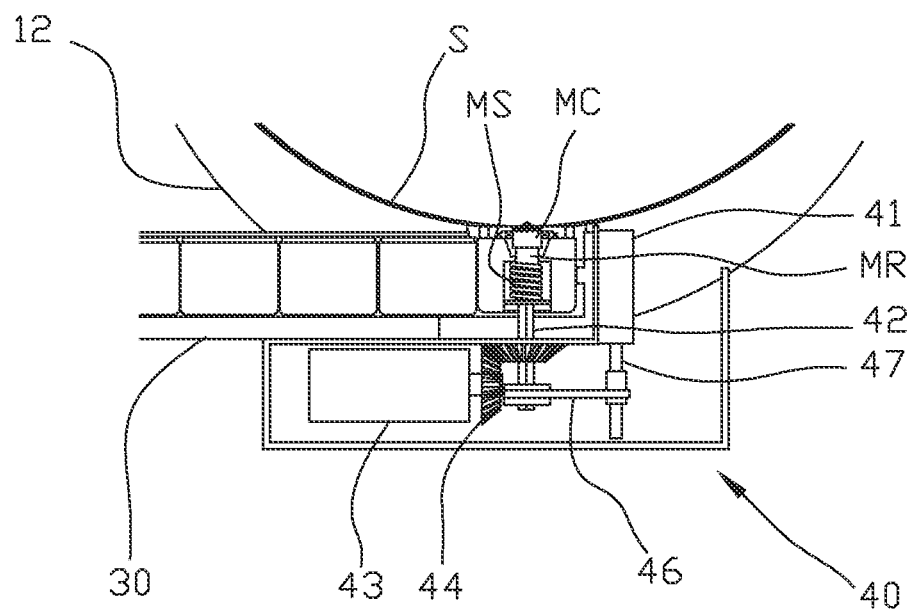
Figure 5D:
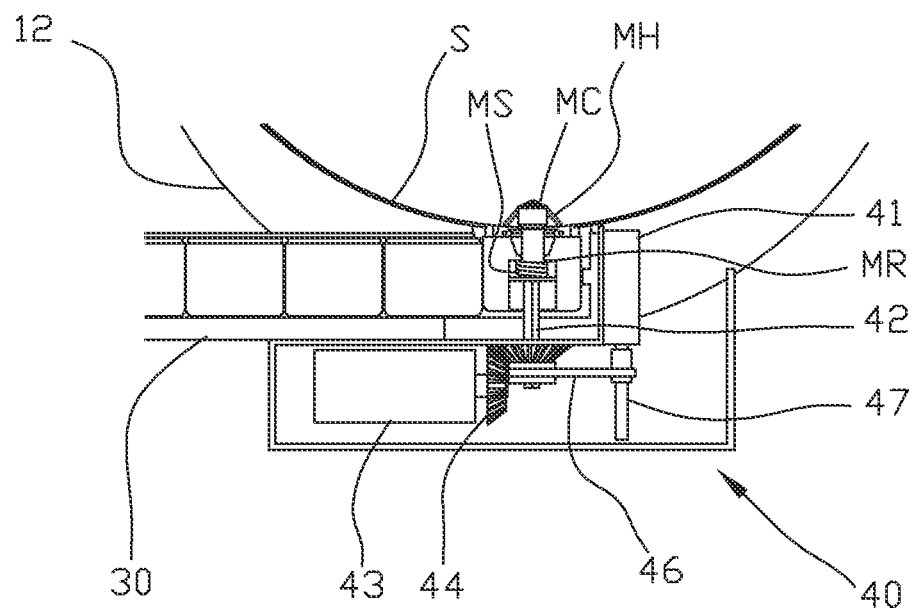

Detail of how the cutting head MC and thus the measuring device M may be secured with respect to sheet S of the object P, is discussed with respect to FIG. 5d.

To provide rotation of the cutting head MC of the measuring device M, the bit 42 of the assembling device 40 is operatively connected to a rotation motor 43. In the embodiment shown in FIGS. 1e and 1f, the rotation motor is in the form of a crawler motor 43 having an axle provided with a cog wheel 430 operatively connected to a portion of the bit 42 by means of a toothed belt 432 configured for engaging said portion of the bit 42. Thus, when activating the crawler motor 43, the bit 42 is rotated around its longitudinal axis and therefore the cutting head MC of the measuring device M is rotated.

In one embodiment, the motors 41, 43 are connected to an onboard energy source in the form of a battery pack (not shown). In another embodiment, the motors 41, 43 are supplied with energy from the control panel 5.

In FIGS. 1a-1f and 1h, the housing 30 of the apparatus 1 is configured for holding a single measuring device, hereinafter also denoted sensor M, that is inserted into the housing 30 by the operator. However, the housing may alternatively be in the form of a magazine 30 configured for holding a plurality of sensors M wherein one sensor M at the time is fed into alignment with the assembling device 40 of the apparatus 1. Such a magazine 30 is shown in FIG. 1g. An embodiment of the magazine 30 is described below with respect to FIGS. 6a and 6b. The magazine 30 is secured to the body of the apparatus 1 by means of a snap-lock. The magazine 30 is released from the apparatus 1 by pushing a snap-lock release button 31.

The apparatus 1 is provided with two pairs of friction elements, here in the form of pillows 70, for abutting against an outer surface of the sheet S of the insulated tubing T. The pillows 70 are preferably made from a flexible material, for example rubber, for proving friction to at least reduce any relative movement between the apparatus 1 and the sheet S once the apparatus 1 is abutting against the sheet S. Each pair of pillows 70 is secured to a carrier 72. The carriers 72 are arranged slidable on a carrier face 74 of the apparatus 1 between a first position as shown in FIG. 1a wherein a distance between the two pairs of pillows 70 is at a maximum, and a second position (not shown) wherein the distance between the two pairs of pillows 70 is at a minimum. When in the second position, end faces 72' of the carriers 72 are close to being coplanar with sidewalls 36 of the housing 30. The purpose of the slidable carriers 72 is to adapt the apparatus 1 for use within a range of diameters of the sheet S. The apparatus 1 is further provided with locking keys 76 for locking each of the carriers 72 with respect to the carrier faces 74 in the first or the second position, or any position therebetween.

In FIG. 1h, the apparatus 1 is shown in a position of use, i.e. abutting against the sheet S of the object P. In the embodiment shown, the apparatus 1 is releasably secured to the object P by means of a fastening device, here in the form of a strap 10 connected to strap connection devices 10'. The strap 10 is tightened by a tightening apparatus, here shown as ratchet mechanism 11 known per se. If or when the apparatus 1 is to be moved along the sheet S of the object P for securing a subsequent sensor M at a distance from a previous sensor M, the strap 10 can be slackened, so that the strap 10 still carries the apparatus 1 with respect to the object P but allows displacement of the apparatus 1.

The apparatus 1 can be secured to the object P at any angular position along a periphery of the sheet S of the object P. To obtain a correct, predetermined angular position of the apparatus 1, the apparatus 1 is provided with a level 60 that is configured for being pivoted into a desired position as indicated by dotted arrow L in FIG. 1a. For example: if the apparatus 1 is to secure the sensor (or sensors) M at an uppermost or lowermost portion of the sheet S, i.e. at 12 o'clock or 6 o'clock, then the level 60 is arranged in parallel with a tangent line between the two pairs of pillows 70, as shown in FIG. 1a. If the apparatus 1 is to secure the sensor (or sensors) M at extreme side portions of the sheet S, i.e. at 3 o'clock or 9 o'clock, then the level 60 is pivoted to 45° with respect to the tangent line between the two pairs of pillows 70. To facilitate achieving a correct position of the pivotable level 60, the level 60 is provided with a position indicator 62. When the sensor M is used for measuring moisture (for monitoring for example a risk for CUI) the sensor M is preferably arranged at a lowermost portion of the sheet S, meaning that the level 60 is arranged in parallel with the tangent line between the two pairs of pillows 70, as shown in FIG. 1a. As shown for example in FIG. 1b, each side portion of the body may be provided with the level 60.

In upper side walls 36 of the housing 30, there is provided supporting bars 37. The supporting bars 37 have as their purpose to secure the measuring device M within the housing 30, and to prevent rotation of the body of the measuring device M while the cutting head MC is rotated by the bit 42 of the assembling device 40. As best seen in FIGS. 1c and 1d, the measuring device M is provided with top-portion comprising two semi-circular portions defined between two straight portions or "chords" configured to abut against said supporting bars 37, thereby being prevented from rotation within the housing 30.

In one embodiment, the supporting bars 37 may be permanently connected to the side walls 36 of the housing.

In another embodiment, at least one of the supporting bars 37 may be releasably attached to the side walls 36 of the housing 30.

In the embodiment shown in FIGS. 1e and 1f, each of the supporting bars 37 are in the form of a pitch rack operatively connected to a pitch rack motor 45 via a pinion drive 48 which is best seen in FIG. 1f. The pitch rack motors 45 may be independently operated by means of the control device 5, for example the control panel shown in FIG. 2a.

FIG. 2a shows a general view of a second embodiment of the apparatus 1 according to the first aspect of the invention wherein the apparatus 1 is in an inactive position. The apparatus 1 is here shown comprising a first or primary gripping device 10 and a second or secondary gripping device 10' connected to the primary gripping device 10 by means of a manipulator mechanism, here in the form of a robot arm 20. In the embodiment shown in FIG. 2a, the robot arm 20 comprises a first arm portion 22, a second or middle arm portion 24 and a third arm portion 26. The arm portions 22, 24, 26 are connected to each other by motor-operated elbows known per se. The middle arm portion 24 may comprise two parts configured for separation, as shown in FIG. 3e.

The robot arm 20 is configured for moving the primary gripping device 10 and the secondary gripping device 10' in an X-Y-Z plane relative to each other. A relative movement in an X-Y-Z plane is particularly advantageous when moving the apparatus 1 past a curvature of an object, such as a bend in a pipeline P. A pipeline P is shown for example in FIGS. 3a-3e. The robot arm 20 itself and the operation thereof is based on known technology.

In the embodiment shown in for example FIG. 2a, the two gripping devices 10, 10' are configured for gripping an object having a substantially circular cross-section. The gripping devices 10, 10' have a fixed radius lower portion 12, 12'. A gripping element 13, 13' extends from each of the lower portions 12, 12' of the gripping device 10, 10'. Each of the gripping elements 13, 13' is provided with a gripping pad 14, 14' for abutting the object P being gripped by the apparatus 1.

In the embodiment shown, a movement of the gripping elements 13, 13' between an inactive, non-gripping position and an active, gripping position is controlled by means of a control unit, here in the form of a control panel 5. The control panel 5 is operatively connected to drive devices (not shown) known per se, such as for example servo motors arranged at the intersections between said lower portions 12, 12' and gripping elements 13, 13', to rotate the latter with respect to the lower portions 12, 12'.

The control panel 5 comprises a screen 6 and an operating panel 7 for controlling all operation of the apparatus 1. In the embodiment shown in FIG. 2a, the control panel 5 transmits power and control signals to relevant components of the apparatus 1 via a cable 8.

Figure 3A:
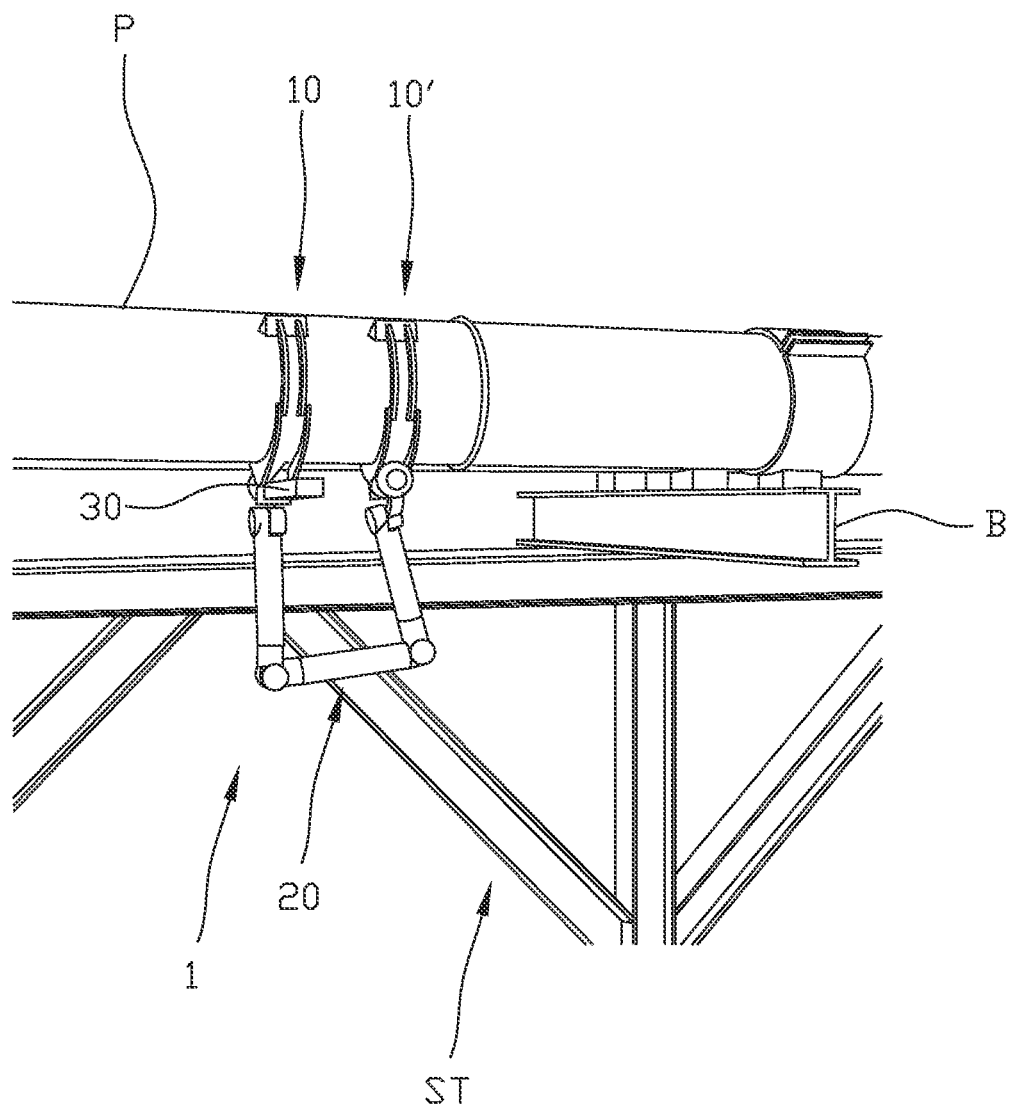
FIGS. 3a-3d show in a smaller scale perspective views of a principle of various steps of moving the apparatus according to the first aspect of the invention along an elevated pipeline.

The apparatus 1 is further provided with a magazine 30, 30' for holding a plurality of measuring devices, for example sensors M, prior to connecting to the object P (see for example FIG. 3a). The measuring devices or sensors M for use with the apparatus 1 according to the invention, may be provided with a cutting head MC (as shown in FIGS. 4 and 5a-5e). The cutting head MC is activated by an assembling device 40 operatively connected to the magazine 30, as will be discussed below in relation to FIGS. 5a-5e.

In the embodiment shown in FIG. 2a, a portion of the primary gripping device 10 is provided with an imaging system 50 for providing an image of a surface of an object abutting the imaging system 50. The imaging system 50 may comprise one or more cameras, and/or a scanner operated by an operator via the control panel 5. In one embodiment, the images provided by the imaging system 50 are presented on the monitor 6 of the control panel 5.

Figure 2B:
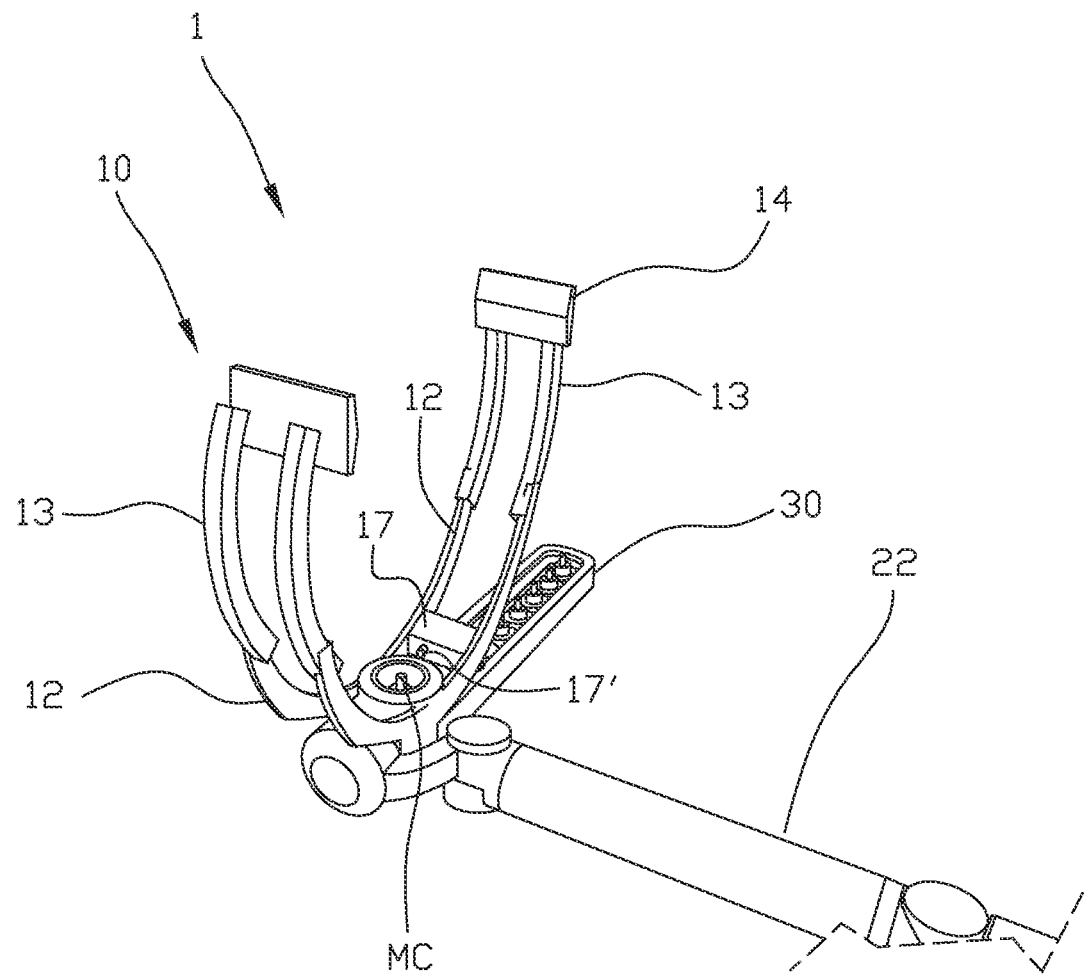

FIG. 2b shows in larger scale a detail of a portion of the apparatus 1 shown in FIG. 2a seen from a different angle. In FIG. 2b a cooling device 17 is shown. The cooling device 17 is arranged at the fixed radius lower portion 12 of the gripping device 10. The cooling device 17 is provided with a nozzle 17' for expelling ambient air sucked into and compressed in a compartment of the cooling device 17. The nozzle 17' is directed towards an area of a sheet (see FIG. 4) to be cut by a penetrating element MC in the form a drill bit forming part of the measuring device M. Thus, the nozzle 17' is directed towards the penetrating element MC. In an alternative embodiment (not shown) the nozzle 17' is operatively connected to a fluid hose supplying utility air from a distant location.

FIGS. 3a-3d show in smaller scale the apparatus 1 shown in FIG. 2a in operation along an object in the form of a pipeline P. The pipeline P is elevated above a ground by means of a structure ST (only a top portion shown). The pipeline P typically comprises a central tubing T surrounded by an insulation material I, wherein the insulation material I is protected by means of a metal sheet S surrounding the insulation material I, see FIG. 4.

The apparatus 1 may be connected to the pipeline P at a portion being within reach of an operator being on a ground, whereupon the apparatus 1 is moved to a desired position on the pipeline P in a manner discussed below. If the pipeline P is without reach of an operator being on the ground, the apparatus may be connected to the pipeline P by means of an access means such as a ladder or a lift (not shown).

As will be understood from FIGS. 3a-3e, it is important that the gripping element 13 of the primary gripping device 10 is operated independently from the gripping element 13' of the secondary gripping device 10'. Preferably, in operation the control panel 5 has a safety configuration preventing the gripping elements 13, 13' to be released simultaneously.

In FIG. 3a the primary gripping device 10 and the secondary gripping device 10' are in an active, gripping position. In this gripping position, a sensor M may be urged from one or both of the magazines 30 (only one visible) and into contact with the pipeline P so that a sensing device of the sensor M penetrates the metal sheet S and senses a portion of insulation material I, see FIG. 4. If the sensor M is the form of for example a noise sensor or a vibration sensor, the sensing device may be integrated in a sensor housing being on an outside of the metal sheet S, i.e. the sensing means of the sensor may not penetrate the metal sheet S.

Figure 3B:
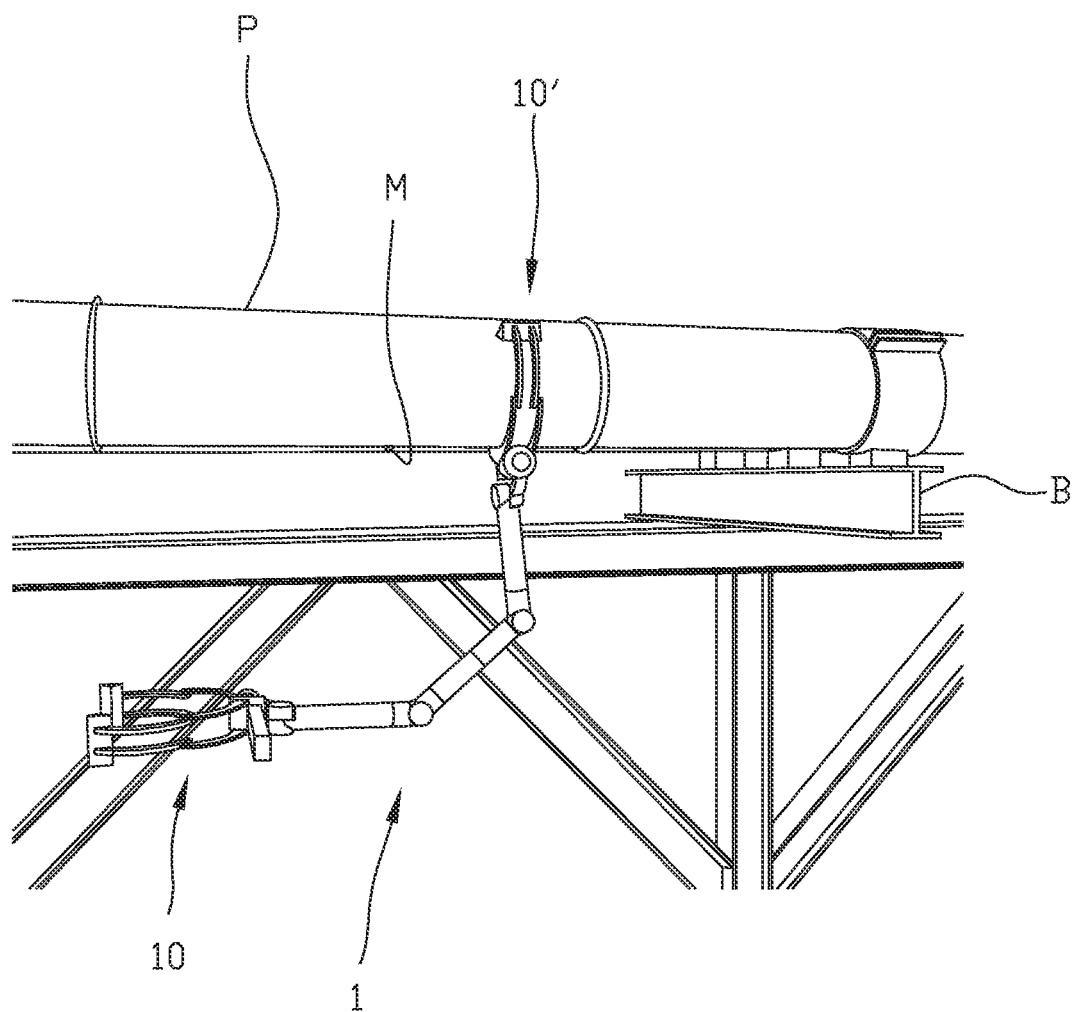
Figure 3C:
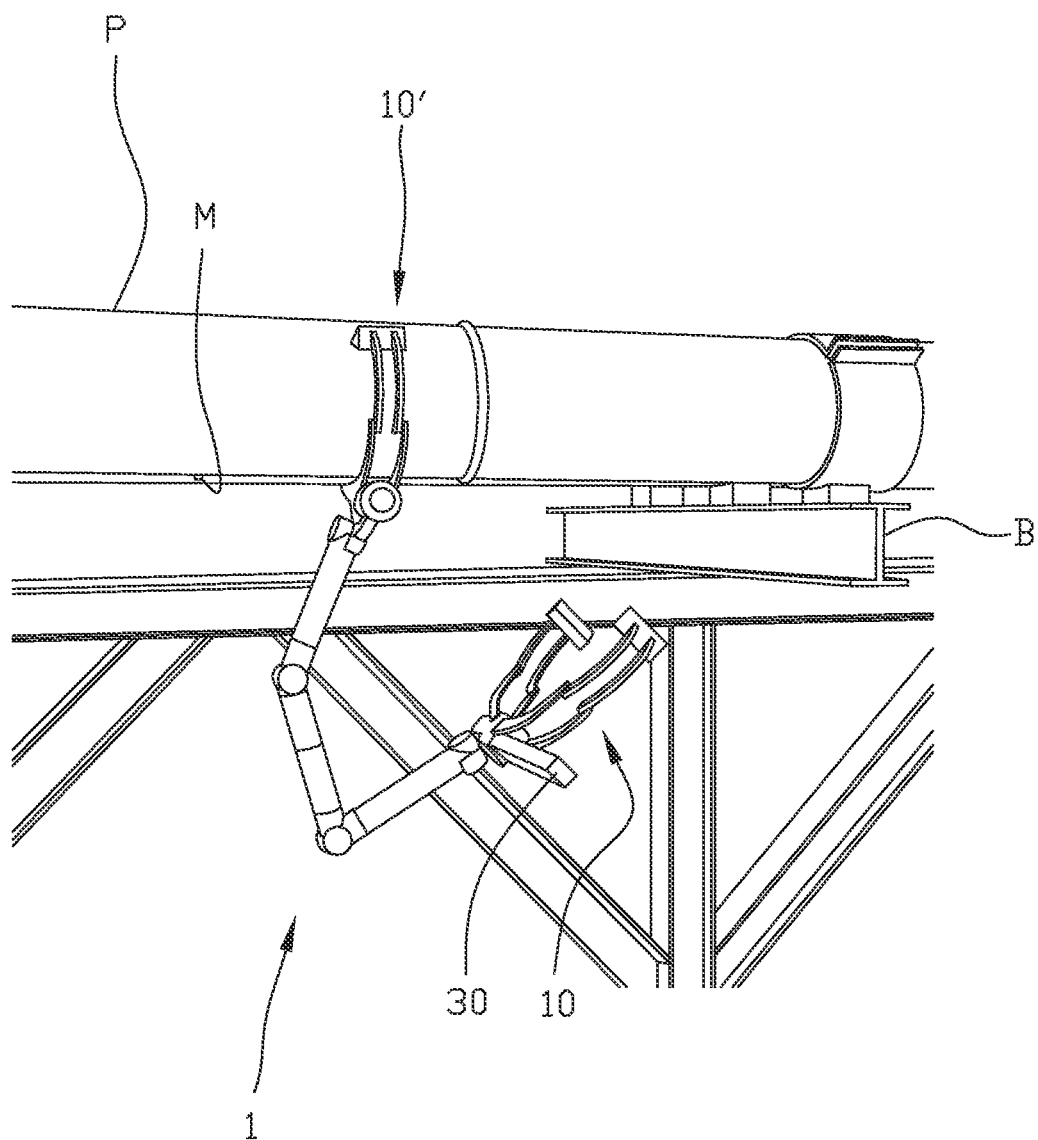

In FIGS. 3b and 3c the primary gripping device 10 has been released from the pipeline P and is moved past the secondary gripping device 10' still being in its active, gripping position. This way of moving the apparatus 1 along the pipeline P is denoted a straddling movement herein. An alternative way of moving the apparatus 1 along the pipeline P is a worm-like movement (not shown) wherein the primary gripping device 10 and the secondary gripping device 10' do not pass or straddle each other. A great advantage of the straddling movement or a worm-like movement is that the apparatus 1 may easily be moved past obstructions such as for example a beam B carrying the pipeline P.

Figure 3D:
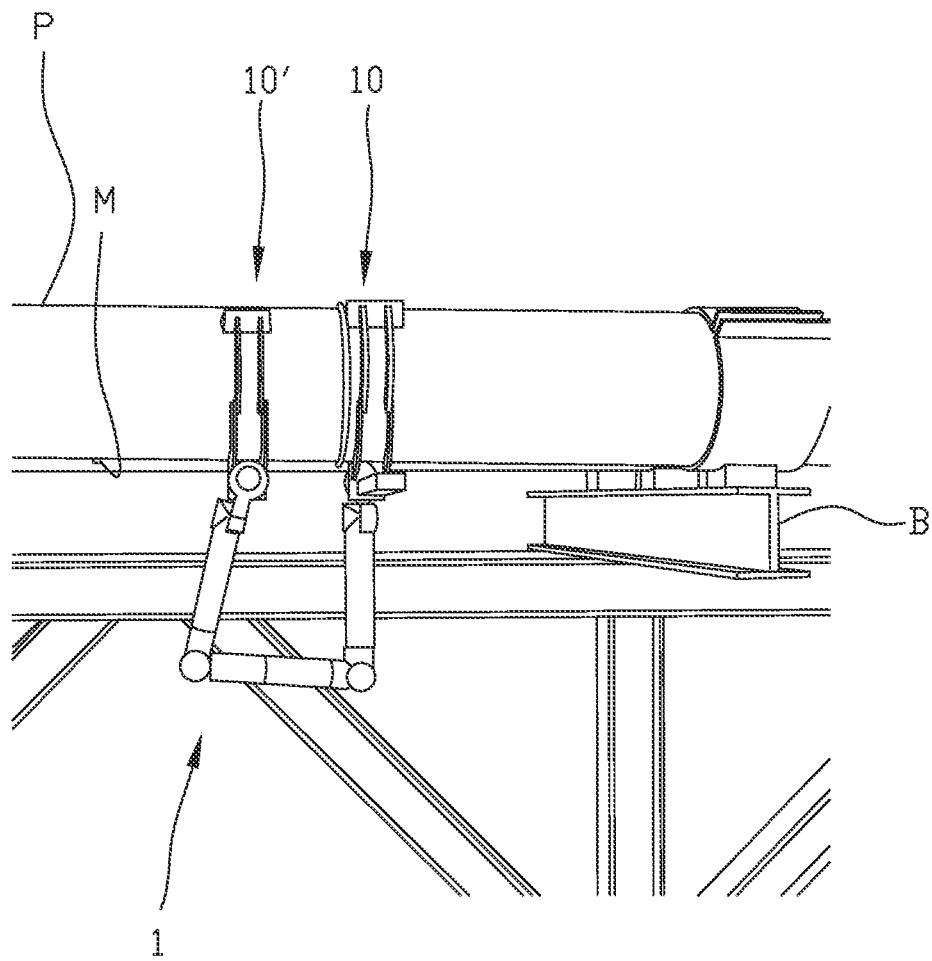
Figure 3E:
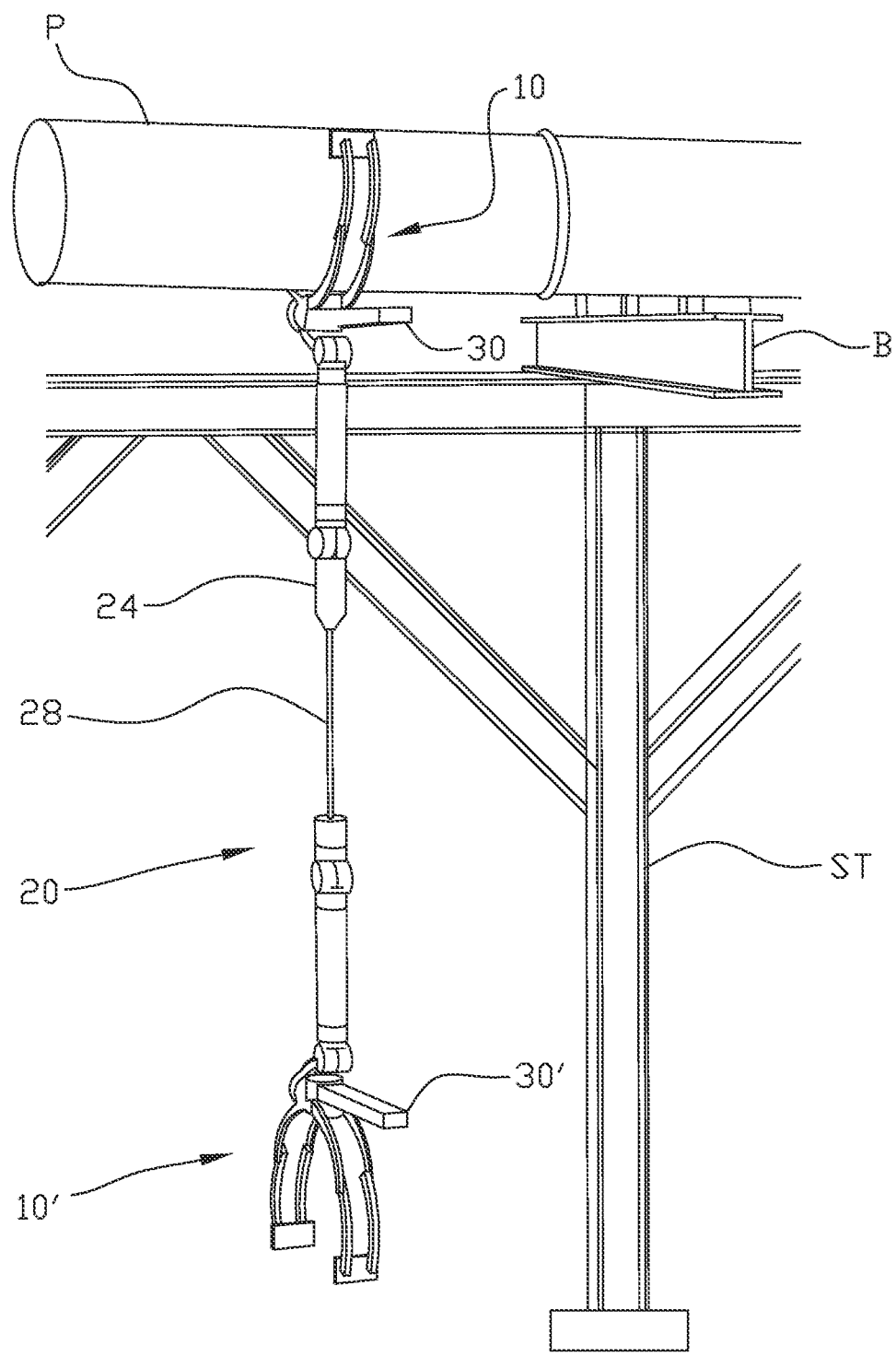
FIG. 3e shows the apparatus according to the first aspect of the invention in a position for reloading measuring devices.

In FIG. 3d the primary gripping device 10 is in the process of again gripping the pipeline P. When secured to the pipeline P, another one of the sensors is brought from the magazine 30 and onto the pipeline P so that the sensing device of the sensor M is in a position for sensing in a portion of the insulation material I surrounding the tubing T of the pipeline. Again, if the sensor M is in the form of for example a noise sensor or a vibration sensor, the sensing device may be integrated in a sensor housing being on an outside of the metal sheet S, i.e. the sensing means of the sensor may not penetrate the metal sheet S.

In FIG. 3e the apparatus 1 is in a position for replacing or refilling the magazine 30' at the secondary gripping device 10' while the primary gripping device 10 is in an active, gripping position. The robot arm 20 is in an extended position wherein a wire 28 has been unspooled from a motor driven reel (not shown) within the midportion 24 of the robot arm 20. The magazine 30' has been lowered to be within reach of an operator (not shown) being on a ground.

Turning now to FIGS. 4 and 5a-5e illustrating a basic principle of the assembling device 40 for bringing a sensor M from the magazine 30 and onto the pipeline P.

Figure 4:
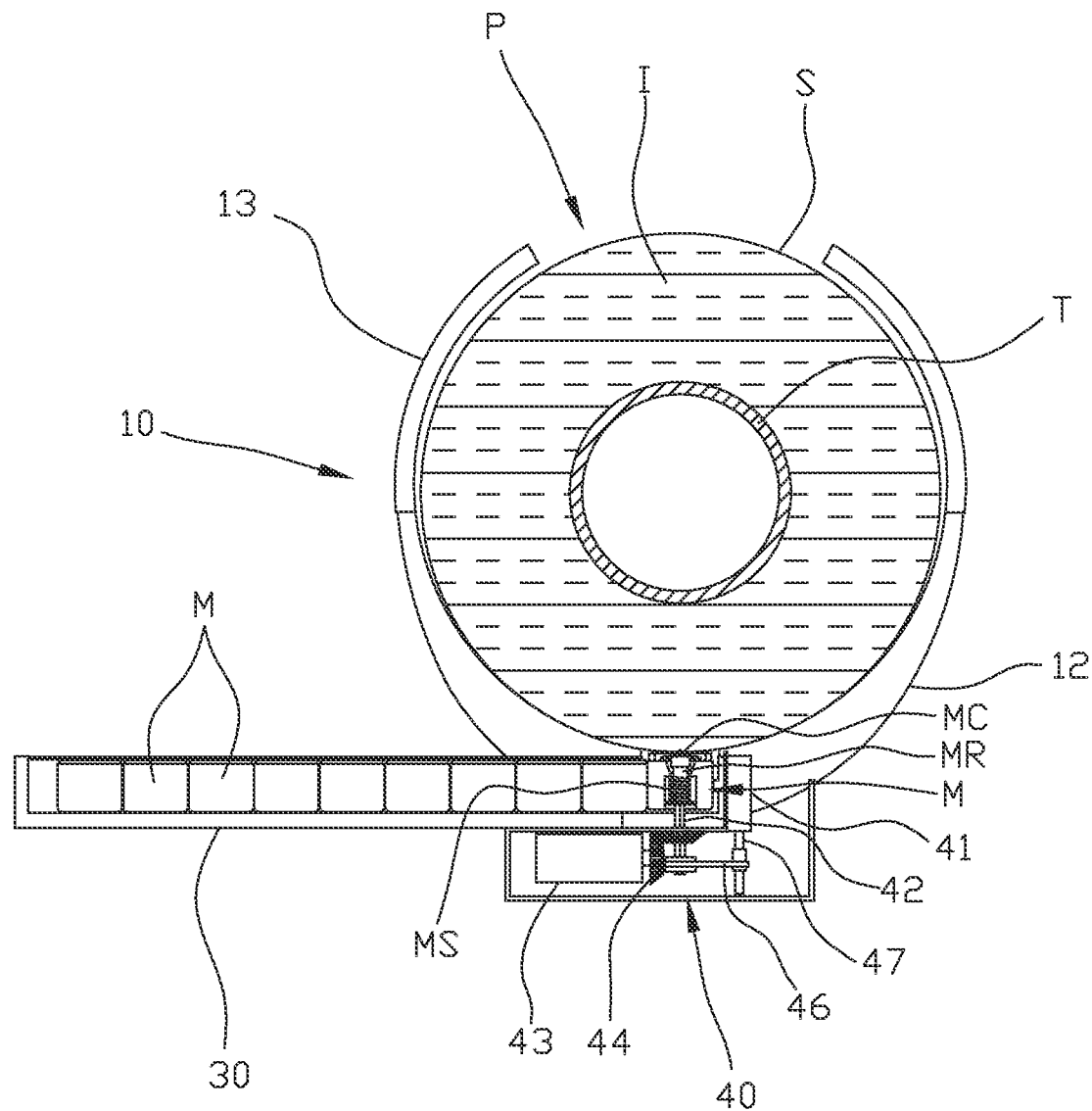
FIG. 4 shows in larger scale a detail of an assembling device prior to connecting a measuring device to a pipe being gripped by the gripping device.

FIG. 4 shows in larger scale the primary gripping device 10 gripping around a portion of the pipeline P. For simplicity, the gripping pads 14 shown in for example FIG. 2a, are not shown in FIG. 4. As mentioned above, the pipeline P comprises a tubing T surrounded by an insulation material I. The insulation material I is protected from the environment by a metal sheet S having a thickness of typically 0.5-0.9 mm depending on a diameter of the sheet S. The assembling device 40 is operatively connected to the magazine 30. In the embodiment shown, the magazine 30 is filled with ten sensors M being of a different type than those shown in FIGS. 2a and 2b.

The assembling device 40 comprises a bit motor 41 for bringing an engagement means, here in the form of a bit 42, into and out of engagement with a portion of the sensor M. The bit 42 is operatively connected to the bit motor 41 via a connector 46 and a motor shaft 47. The assembling device 40 further comprises a rotation motor 43 operatively connected to the bit 42 for rotating the bit 42.

The sensor M suitable for use with one embodiment of the apparatus 1 disclosed herein, comprises a cutting head MC for cutting through the metal sheet S. The cutting head MC comprises a hollow rod MR for receiving the bit 42 of the assembling device 40, and a biasing member, here in the form of a spring MS arranged within a recess in the sensor M. The spring MS surrounds a portion of the rod MR. The cutting head MC is further provided with a spring-loaded retaining means MH (see FIGS. 5d and 5e) for preventing the cutting head MC and thus the sensor M from disconnecting from the pipeline P after penetrating the metal sheet S.

In FIG. 5a the bit 42 is in a passive position wherein the bit 42 does not engage the rod MR. When energizing and rotating the bit motor 41, the connector 46 is raised towards the bit motor 41 as indicated by the dotted vertical arrow, and the bit 42 is lifted towards the rod MR of the sensor M.

In FIG. 5b, the bit 42 engages the rod MR and the rotating motor 43 is activated via an angular gear 44 to rotate the cutting head MC. It should be noted that the rotation of the bit 42 may alternatively be provided as described above with respect to FIGS. 1a-1h. In FIG. 5c a tip of the cutting head MC has penetrated the metal sheet S. The rotation of the cutting head MC continues until the entire cutting head MC has penetrated the metal sheet S as illustrated in FIG. 5d. In FIG. 5d the spring-loaded retaining means MH is folded out and prevents the cutting head MC from moving out of the aperture provided by the cutting head MC.

Figure 5E:
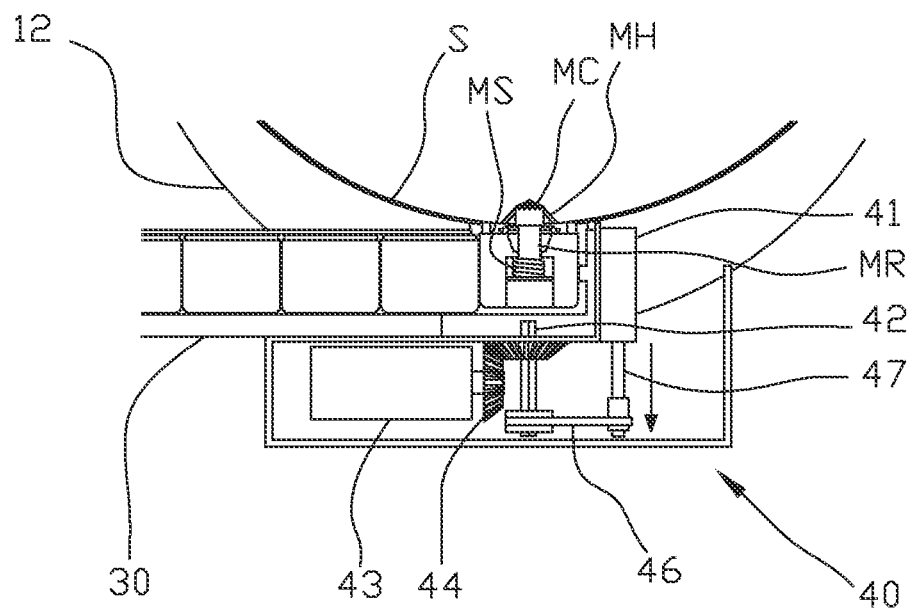

In FIG. 5e, the bit motor 41 is rotated in opposite direction to run the connector 46 towards an expanded position with respect to the bit motor 41, and the bit 42 is disengaged from the rod MR of the sensor M.

Figure 6A:
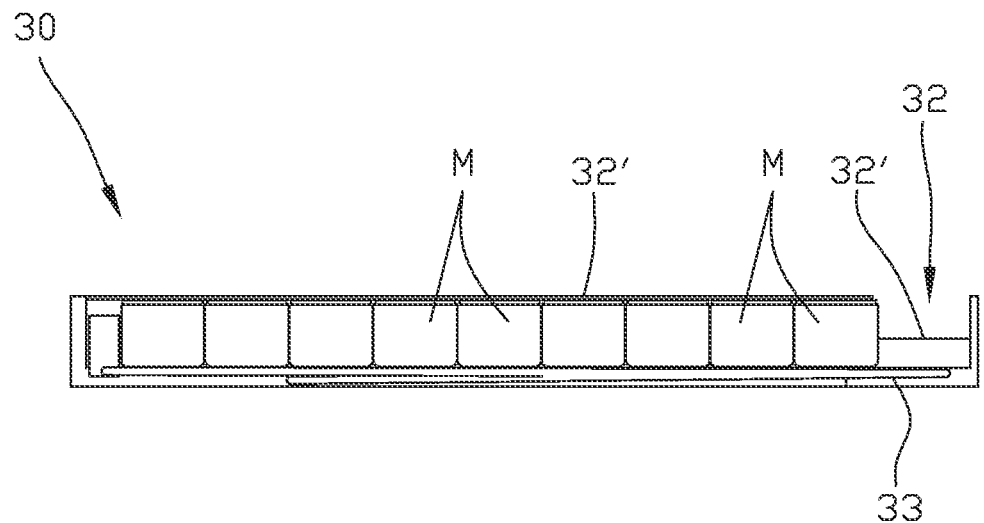
FIGS. 6a-6b show details of a magazine seen from a side and from a bottom, respectively.

When the relevant sensor M has been connected to the pipeline P as shown in FIG. 5e, the apparatus with the magazine 30 may be lowered somewhat to allow freeing of the magazine 30 from the sensor M that has been fixedly connected to the piping P. To make this lowering of the magazine 30 as small as possible, a side wall of the magazine 30 is provided with a recess 32 provided by a reduced height of back wall 32' so that the sensor M may pass therethrough. The recess 32 is best seen in FIG. 6a showing a sideview of one embodiment of the magazine 30. For illustrative purpose only, the back wall 32' of the magazine 30 with the recess 32 is shown in FIG. 6a. It should be noted that in alternative embodiment, the apparatus 1 is provided with supporting bars 37 as shown for example in FIG. 1g and described above. By retracting at least one of the supporting bars 37, the apparatus 1 can be released form the sensor M that has been secured to the piping P by moving the apparatus sideways instead of lowering the apparatus 1.

Figure 6B:
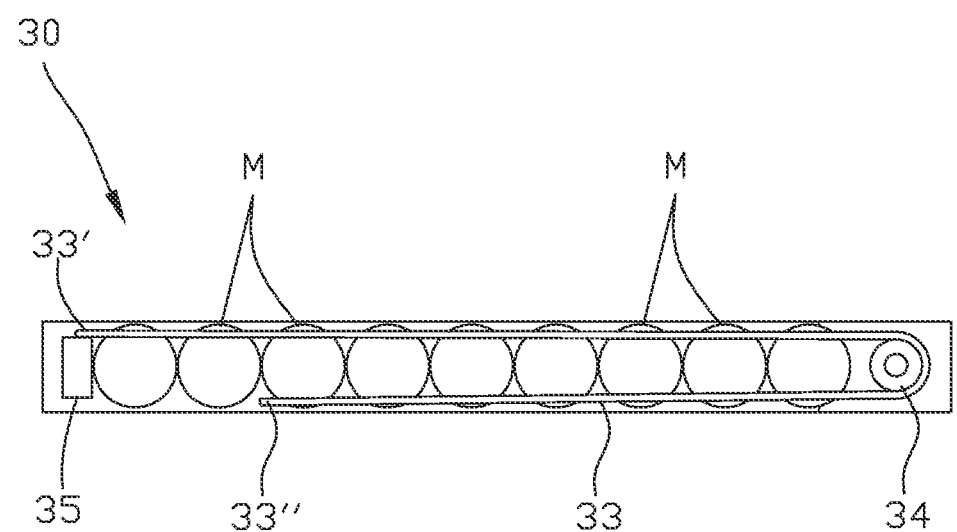

FIG. 6b illustrates an example of an arrangement for urging the sensors M towards their activating position within the magazine 30. The magazine is in FIG. 6b seen from a top. A resilient member, such as an elastic band 33 runs past one or a pair of pulleys 34 (one shown in FIG. 6b). A first end portion 33' of the elastic band 33 is connected to a piston 35, and a second end portion 33" of the elastic band 33 is fixed to a portion of the magazine 30. Thus, the elastic band 33 and the piston 35 urge the sensors M towards their activating position (to the right in FIGS. 6a and 6b). As an alternative to the elastic band 33 and the pulley 34, a spring (not shown) can be arranged between a left end wall of the magazine 30 and the piston 35.

FIGS. 7a-7e disclose a principle of another embodiment of the apparatus according to a first aspect the present invention. In said figures, the manipulator mechanism is in the form of a drone 21 for moving the gripping device 10 into contact with the object, here in the form of an insulated pipeline P. The drone 21 is operatively connected to a pair of arms 55 extending from a portion of the assembling device 40.

Figure 7A:
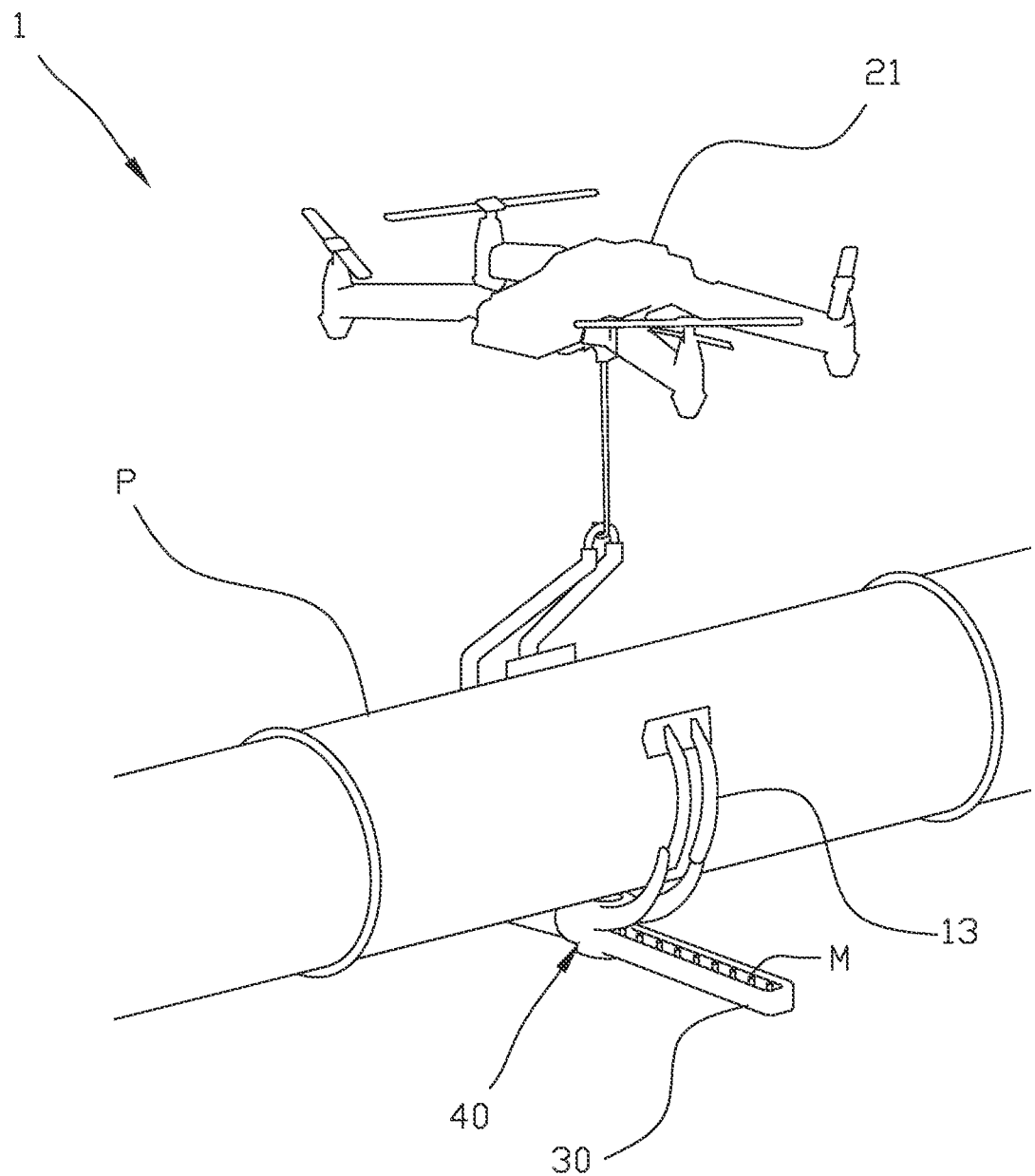
FIGS. 7a-7e show a perspective view of other embodiments of the apparatus according to a first aspect of the present invention.
Figure 7B:
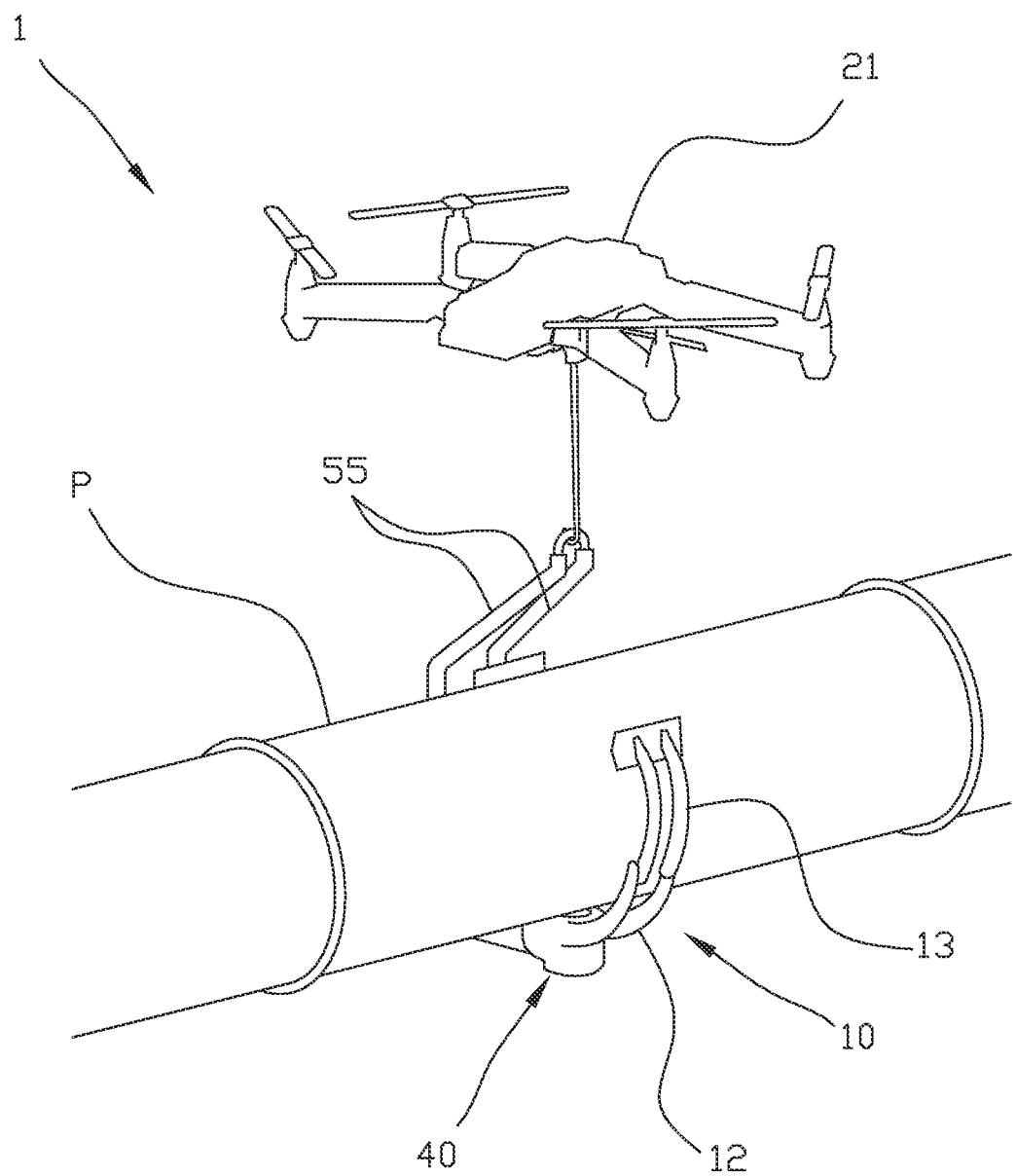
Figure 7C:
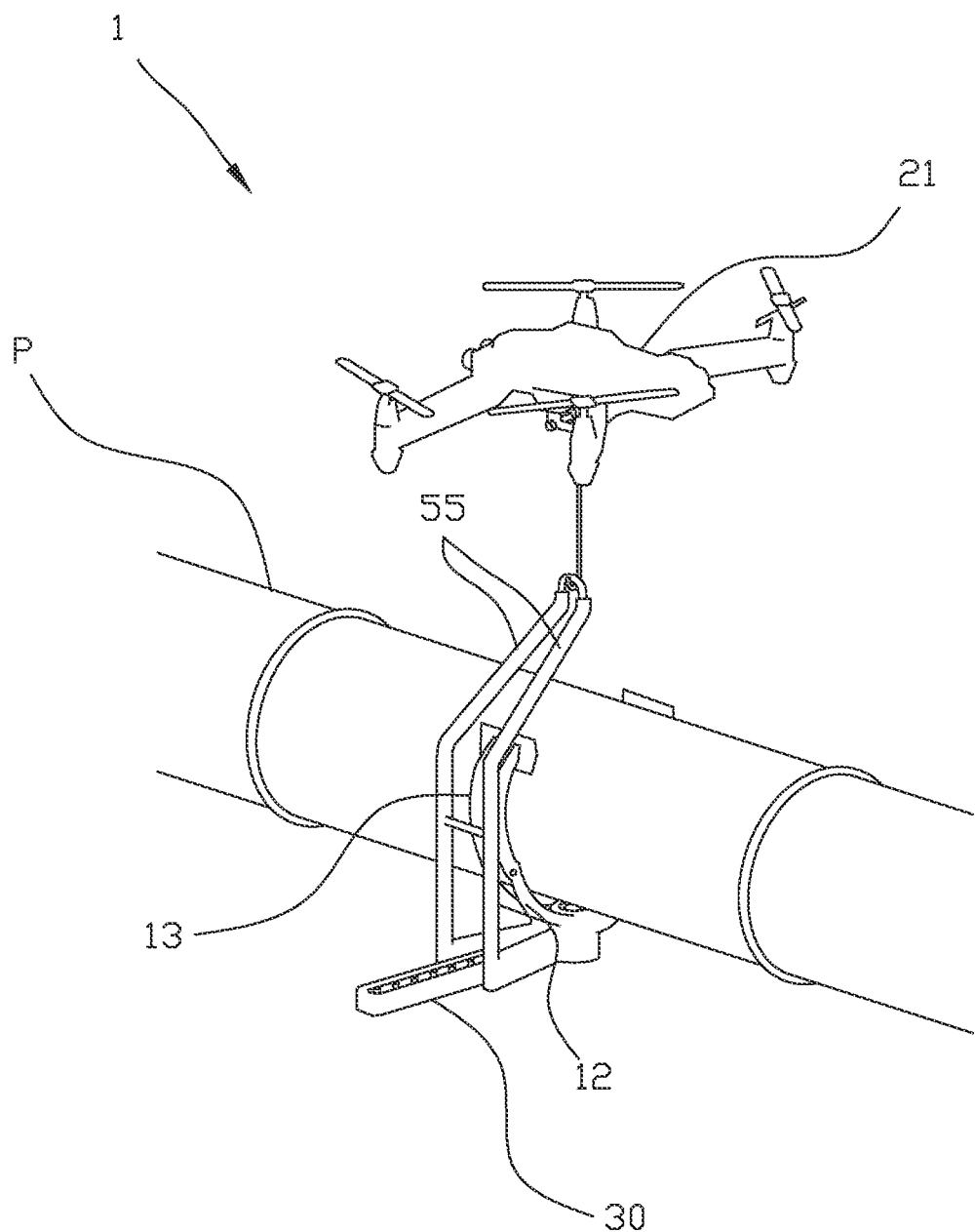

In FIGS. 7a-7c, the gripping device 10 is similar to the gripping device 10 shown for example in FIG. 2a. The difference between FIG. 7a and FIGS. 7b and 7c is the position of the magazine 30 for holding the plurality of measuring devices, for example sensors M. In FIG. 7a, the magazine 30 extends from an opposite side of the pair of arms 55, while in FIGS. 7b and 7c the magazine 30 extends between a lower portion of the pair of arms 55.

Figure 7D:
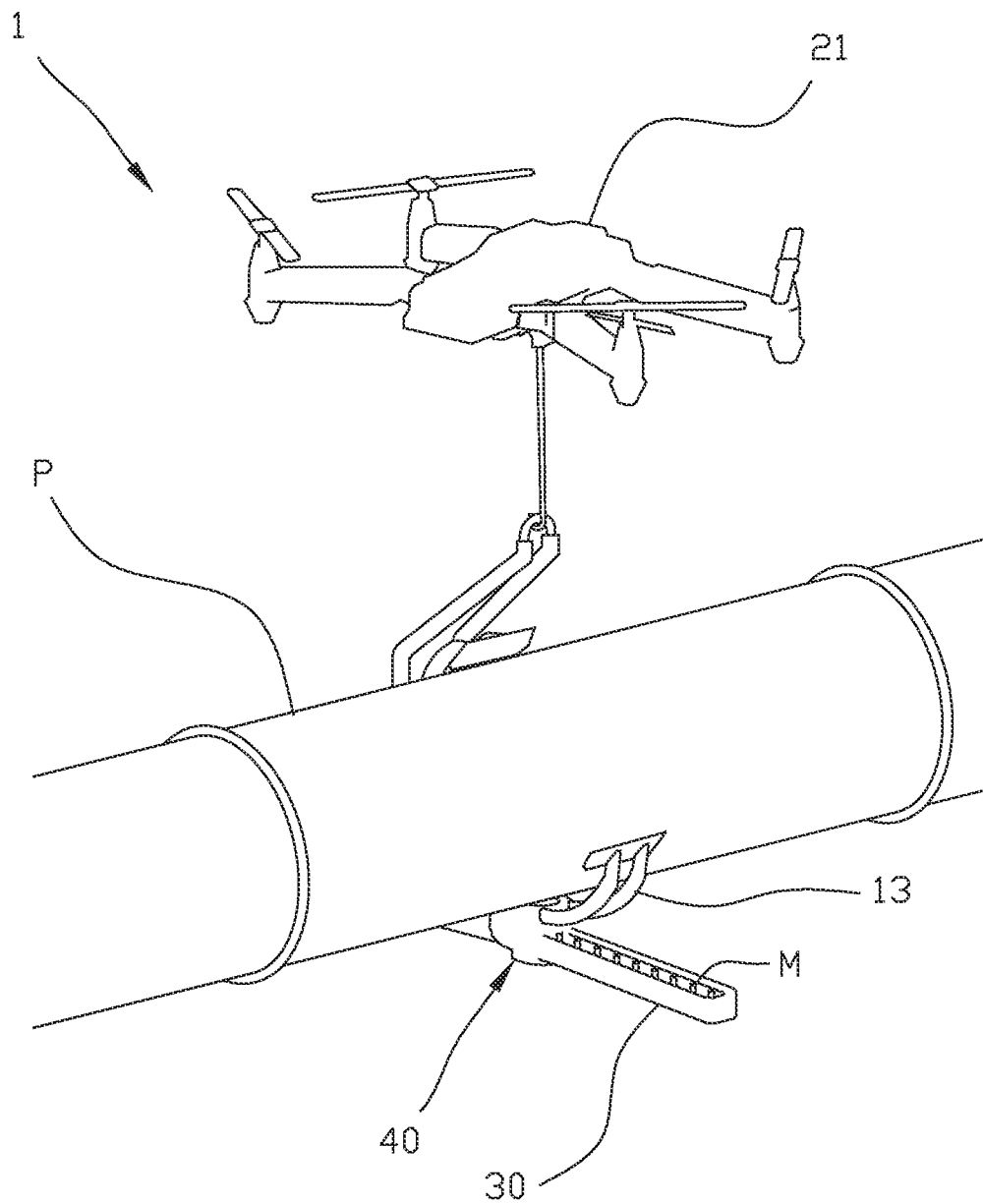
Figure 7E:
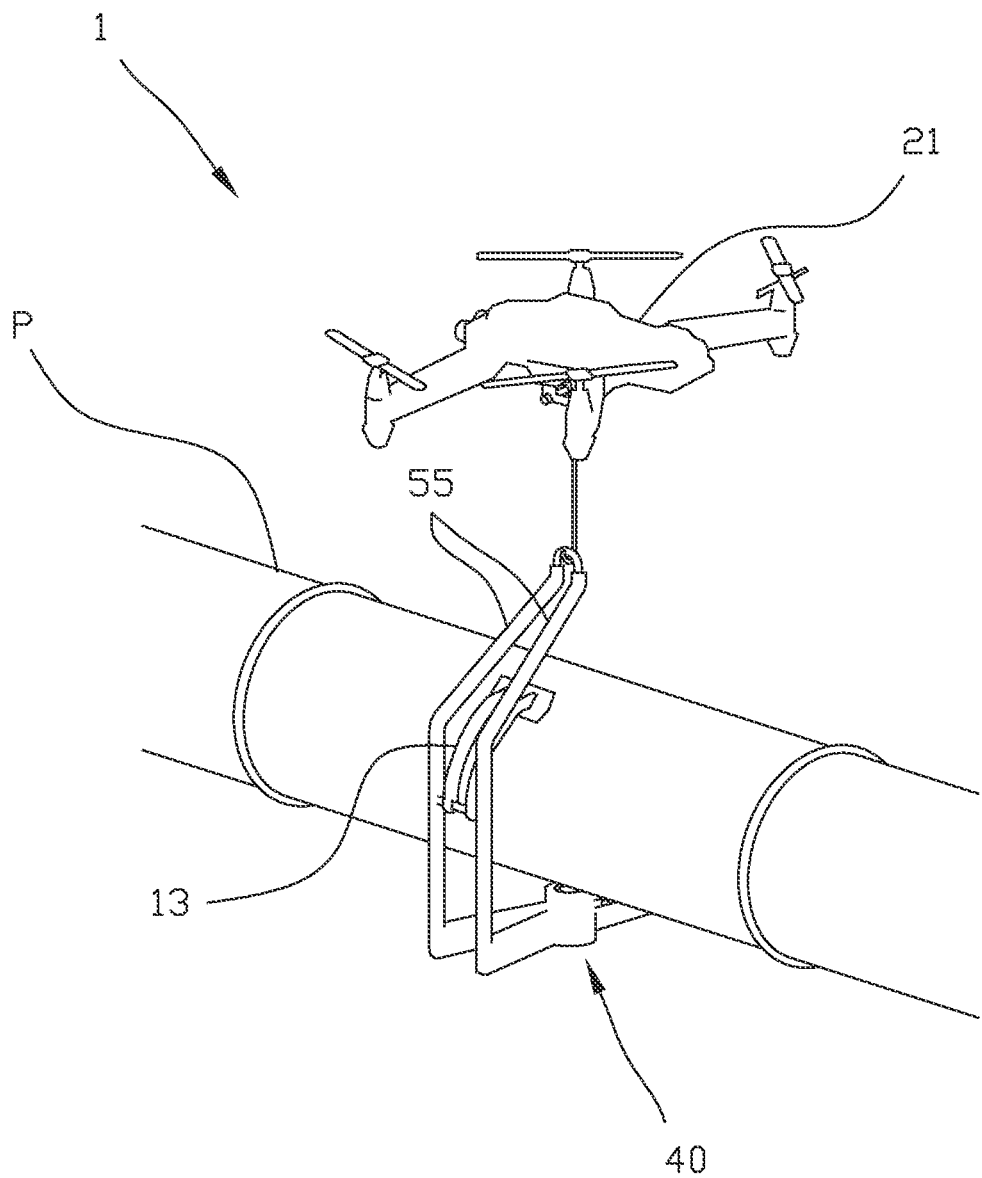

In FIGS. 7d and 7e, the gripping device 10 comprises gripping elements 13 only, and not the fixed radius lower portion 12 as shown in for example FIG. 2a. A movement of the gripping elements 13 between an inactive, non-gripping position and an active, gripping position is controlled by means of a wireless remote-control device (not shown) similar to the remote-control device 5 shown in FIG. 2a. The remote-control device is configured for communicating with drive devices (not shown) known per se, such as for example servo motors.

Activation of the assembling device 40 is operated by the wireless remote control in the same way as for the embodiment discussed above for the first embodiment.

The apparatus shown in FIGS. 7a-7e is provided with an energy source, such as batteries (not shown) arranged within a portion of the pair of arms 55 to provide power for operating the servo motors for operating the gripping device 10 and the assembling device 40.

In FIGS. 7a-7e the apparatus 1 is in a position for connecting the sensors M to a lowermost portion of the pipeline P. The drone 21 hangs in the air above the pipeline P. If a sensor M is to be connected to the pipeline P at a side portion of the pipeline P, the drone 21 is moved sideways with respect to the pipeline P so that the gripping device 10 and the assembling device 40 is rotated with respect to the pipeline P.

To move past an obstruction, such as for example a beam B shown in FIGS. 3a-3e, the drone 21 and thus the rest of the apparatus 1, is maneuvered past the obstruction.

From the above, it should be understood that the apparatus 1 disclosed herein has great advantages in that measuring devices M can be installed without scaffolding or other remedies, and in that the apparatus 1 can be controlled from a remote location. This has great advantages both from an HSM point of view, and from an economical point of view.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An apparatus for securing at least one measuring device to an object, the measuring device being configured for monitoring the object and is provided with a penetrating element for perforating a sheet forming part of the object, the apparatus comprises:
    a body comprising:
        a housing for holding the measuring device; and
        an assembling device for moving the measuring device with respect to the housing, the assembling device comprising an engagement means movable between a retracted, passive position, and an extended, active position for engaging the measuring device to urge the penetrating element of the measuring device through the sheet of the object to secure the measuring device to the object; and
    a control device for operating the assembling device.

2. The apparatus according to claim 1, wherein the housing comprises a magazine for holding at least two measuring devices prior to mounting on the object.

3. The apparatus according to claim 1, wherein the apparatus is provided with a fastening device for releasably securing the body to the object at a desired position.

4. The apparatus according to claim 3, wherein the fastening device is a gripping device configured for being moved both ways between a passive, non-gripping position, and an active, gripping position.

5. The apparatus according to claim 4, further comprising a manipulator mechanism for moving the body with respect to the object.

6. The apparatus according to claim 5, wherein the manipulator mechanism comprises a manipulator arm.

7. The apparatus according to claim 5, wherein the manipulator mechanism is a drone.

8. The apparatus according to claim 4, wherein the gripping device comprises a primary gripping device and a secondary gripping device for releasably gripping the object, the secondary gripping device operatively connected to the primary gripping device via the manipulator mechanism.

9. The apparatus according to claim 8, wherein the housing comprises a magazine for holding at least two measuring devices prior to mounting on the object, and wherein the magazine and the assembling device are arranged in connection with the primary gripping device, and the secondary gripping device is similar to the primary gripping device.

10. The apparatus according to claim 9, wherein a further magazine and a further assembling device is arranged in connection with the secondary gripping device.

11. The apparatus according to claim 8, wherein the manipulator mechanism is configured for moving the primary gripping device with respect to the secondary gripping device at least in a two-dimensional plane.

12. The apparatus according to claim 1, wherein the engagement means of the assembling device is operatively connected to a motor for effecting axial movement of the penetrating element of the measuring device and thereby effecting said perforation of the sheet of the object to connect the measuring device to the object.

13. The apparatus according to claim 12, wherein the assembling device is further provided with a rotation motor configured for effecting rotating of the engagement means and thereby the penetrating element.

14. The apparatus according to claim 13, wherein the rotation motor is configured for rotating the bit at a speed being less than 50 revolutions/sec., preferably less than 20 revolutions/sec., and most preferably less than 10 revolutions/sec.

15. The apparatus according to claim 13, wherein the apparatus is further provided with a cooling device directing a fluid towards a bit (MC) of the measuring device.

16. The apparatus according to claim 1, further comprising a monitoring device operatively connected to one or more components of the apparatus and configured for providing an image of a portion of a surface of the object.

17. A method for securing at least one measuring device to an object, wherein the method comprises the steps of:

a) providing an apparatus for securing the at least one measuring device to the object, the measuring device being configured for monitoring the object and is provided with a penetrating element for perforating a sheet forming part of the object, the apparatus comprises:
  a body comprising:
    a housing for holding the measuring device; and
    an assembling device for moving the measuring device with respect to the housing, the assembling device comprising an engagement means movable between a retracted, passive position, and an extended, active position for engaging the measuring device to urge the penetrating element of the measuring device through the sheet of the object to secure the measuring device to the object; and
    a control device for operating the assembling device;
b) abutting the apparatus against a desired portion of the object;
c) activating the assembling device to bring the engagement means into engagement with the measuring device and urge the penetrating element of the measuring device through the sheet of the object so that the measuring device is secured to the object; and
d) releasing the assembling device from the measuring device.

18. The method according to claim 17, further comprising:
e) moving the apparatus to a new location and aligning a further measuring device with respect to the assembling device; and
f) repeating steps b)-e) until a predetermined number of measuring devices have been secured to the object.

19. The method according to claim 18, wherein the method comprises moving the apparatus to a new location via a manipulator mechanism comprising a manipulator arm and securing the apparatus to the object via a gripping device comprising a primary gripping device and a secondary gripping device for releasably gripping the object, the secondary gripping device operatively connected to the primary gripping device via the manipulator arm.

20. The method according to claim 18, wherein the method comprises moving the apparatus to a new location by an operator and securing the apparatus to the object via a releasable securing device.

* * * * *